United States Patent
Goda et al.

(10) Patent No.: US 7,364,014 B2
(45) Date of Patent: Apr. 29, 2008

(54) SOUND ABSORBING BODY, SOUND ABSORBING STRUCTURAL BODY, AND METHOD OF MANUFACTURING THESE BODIES

(75) Inventors: Hirofumi Goda, Chiba (JP); Minoru Sugawara, Chiba (JP); Yoshiaki Saito, Chiba (JP); Takeharu Suga, Hiroshima (JP); Masaharu Okamura, Hiroshima (JP); Toshifumi Sakai, Hiroshima (JP)

(73) Assignees: Prime Polymer Co., Ltd., Tokyo (JP); Daikyonishikawa Corporation, Hiroshima (JP)

( * ) Notice: Subject to any disclaimer, the term of this patent is extended or adjusted under 35 U.S.C. 154(b) by 0 days.

(21) Appl. No.: 10/512,572

(22) PCT Filed: Apr. 25, 2003

(86) PCT No.: PCT/JP03/05355

§ 371 (c)(1),
(2), (4) Date: Jun. 2, 2005

(87) PCT Pub. No.: WO03/091987

PCT Pub. Date: Nov. 6, 2003

(65) Prior Publication Data

US 2005/0252714 A1  Nov. 17, 2005

(30) Foreign Application Priority Data

Apr. 26, 2002 (JP) .............................. 2002-127547

(51) Int. Cl.
*E04B 1/82* (2006.01)
(52) U.S. Cl. ...................... 181/293; 181/204; 181/290; 181/291; 181/294
(58) Field of Classification Search ................ 181/204, 181/290, 294, 293, 288, 291
See application file for complete search history.

(56) References Cited

U.S. PATENT DOCUMENTS 4,128,683 A  12/1978  Nomura et al.

FOREIGN PATENT DOCUMENTS

| EP | 919351 A2 * | 6/1999 |
|---|---|---|
| EP | 1 020 846 A2 | 7/2000 |
| JP | 3-269598 | 12/1991 |
| JP | 05-301262 | 11/1993 |
| JP | 6-226400 | 8/1994 |
| JP | 08-244150 | 9/1996 |
| JP | 11-170290 | 6/1999 |
| JP | 11-272280 | 10/1999 |

(Continued)

*Primary Examiner*—Lincoln Donovan
*Assistant Examiner*—Jeremy Luks
(74) *Attorney, Agent, or Firm*—Oblon, Spivak, McClelland, Maier & Neustadt, P.C.

(57) ABSTRACT

A sound absorbing body 40 has a molded body 44 including two unexpanded layers 41, 42 and an expanded layer 43 having a number of voids and held between these unexpanded layers 41, 42, a plurality of holes 41A of a depth that passes through the unexpanded layer 41 and does not reach the other unexpanded layer 42 are formed at any positions on the molded body 44, a cross-sectional area of the hole 41A is in the range from 0.785 to 314 mm$^2$, and the pitch is 1 mm or larger. Laminating a plurality of materials is not required, and both the sound absorbing capability and sound insulating capability can be secured by integral molding, and further, only unpleasant sounds can selectively be absorbed.

19 Claims, 15 Drawing Sheets

FOREIGN PATENT DOCUMENTS

| | | |
|---|---|---|
| JP | 2000-52371 | 2/2000 |
| JP | 2000-206976 | 7/2000 |
| JP | 2001-079645 | 3/2001 |
| JP | 2002-82671 | 3/2002 |

\* cited by examiner

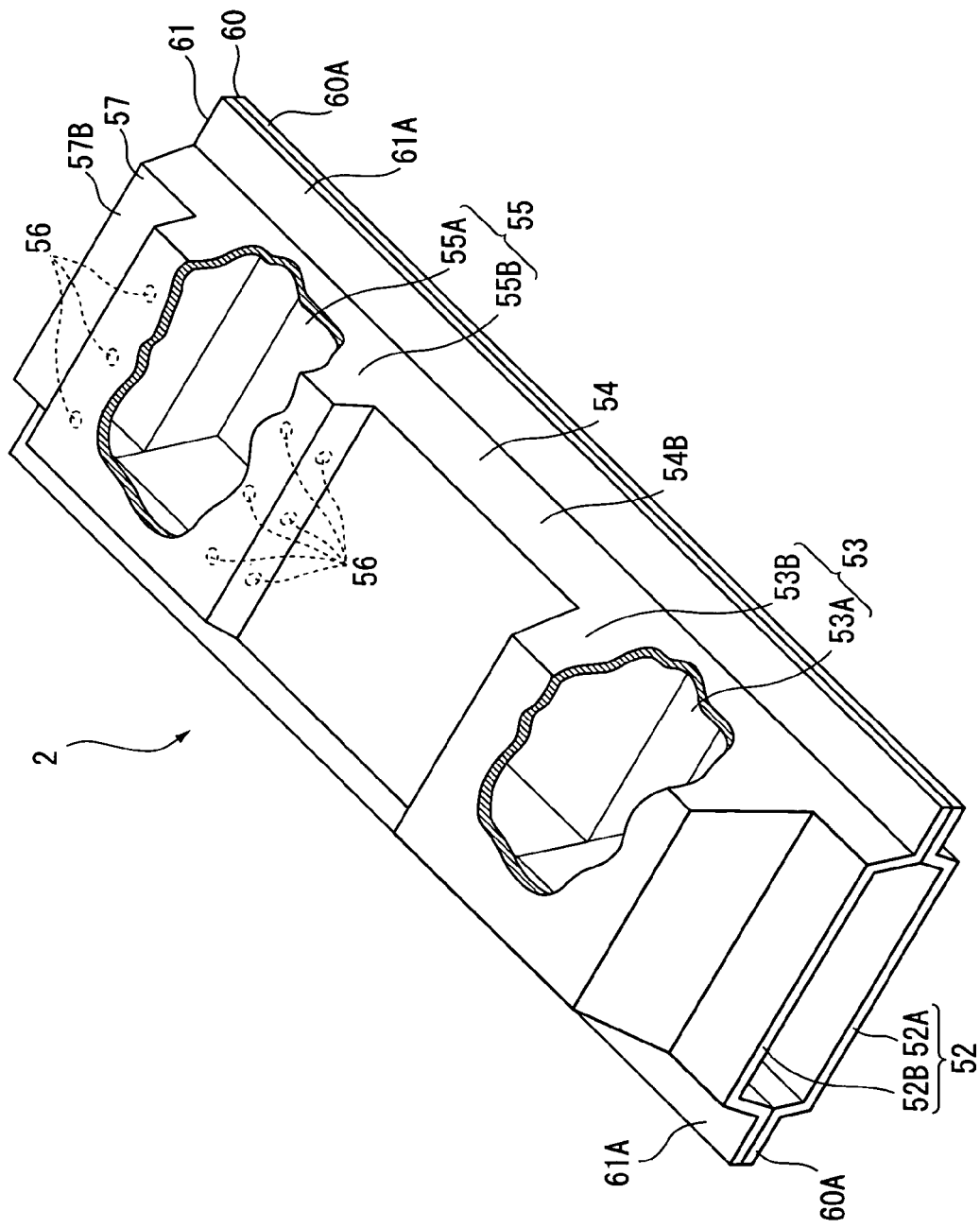

SOUND ABSORBING BODY, SOUND ABSORBING STRUCTURAL BODY, AND METHOD OF MANUFACTURING THESE BODIES

TECHNICAL FIELD

The present invention relates to a sound absorbing body, a sound absorbing structural body, and a method of manufacturing these bodies.

BACKGROUND ART

There have been used a sound insulating material and a sound absorbing material for insulating undesired sounds and noises. As a sound absorbing material, unwoven cloth or a molded foam body which is soft and well absorbs sounds is generally used. The sound absorbing body as described above has no rigidity, and the sound insulating capability can not generally be expected.

For instance, Japanese Patent Laid-Open Publication No. 2000-206976 discloses the technology to improve the sound-absorbing capability and absorb sounds in a desired frequency range by providing through holes or semi-through holes each having a desired shape and size with a given pitch space in a foam sheet with both closed-cell air bubbles and open-cell ones existing therein. This patent describes, however, that through holes and semi-through holes are equally effective in absorbing sounds, and it can not be expected that this patent provides the sound insulating capability and rigidity.

On the other hand, as a sound insulating material, a material having high density and high rigidity and hardly vibrated by sonic waves is generally used. However, the sound insulating material as described above insulates sounds by reflecting sonic waves, so that the sound insulating material does not absorb sounds and generally the sound absorbing capability can not be expected.

With the sound absorbing material and sound insulating material based on the conventional technology, it is not possible to secure both the sound absorbing capability and sound insulating capability, and in order to secure both the sound absorbing capability and sound insulating capability simultaneously, complicated processes such as laminating a sound absorbing material and a sound insulating material together, so that the production process disadvantageously becomes complicated.

If it is tried to secure both the sound absorbing capability and sound insulating capability at the same time by laminating a sound absorbing material and a sound insulating material together, any of product characteristics such as the heat resistance, rigidity, light weight, and shape may be sacrificed. In addition, materials constituting the sound absorbing material and sound insulating material to be laminated together must be optimized, so that selection of the materials is also disadvantageously complicated.

For instance, Japanese Patent Laid-Open Publication No. Hei 8-244150 discloses a sound absorbing member formed by laminating a molded body prepared by heating and expanding a yarn-manufactured fiber-reinforced sheet (such as a KP sheet) and then compressing together with an ordinary resin molded body with an air layer therebetween. However, the holes provided in the papermaking method fiber-reinforced sheet completely penetrate through the sheet, so that the sound absorbing effect of the sheet itself is low and the sheet is very heavy.

Further, it is required to selectively absorb only sounds in a specified frequency range in some applications. For instance, sounds generated by an automobile engine include unpleasant ones and pleasant ones. Even if it is tried to absorb engine sounds with the conventional type of sound absorbing body, the conventional type of sound absorbing body can not selectively absorb sounds in a specific frequency range. Namely, there occurs the problem that not only unpleasant sounds but also pleasant sounds, e.g. an engine sound with a specific frequency, are absorbed.

For instance, Japanese Patent Laid-Open Publication No. 2000-52371 discloses providing semi-through holes on one surface of an injection-molded body having a skin layer on a surface thereof and a spring back structure therein, but does not suggest nor disclose that the desired sound absorbing capability can be achieved by setting a pitch space with a specific value.

An object of the present invention is to provide a sound absorbing body and a sound absorbing structural body capable of ensuring both the sound absorbing capability and sound insulating capability by integral molding without laminating a plurality of materials together and also selectively absorbing only unpleasant sounds, and a method of manufacturing the bodies.

DISCLOSURE OF THE INVENTION

To achieve the object described above, the sound absorbing body according to the present invention includes a molded body having two unexpanded layers and an expanded layer held between the unexpanded layers and having a number of voids, and a plurality of holes of such a depth that passed through one of the unexpanded layer and not reaching the other unexpanded layer are formed at any positions of the molded body, and is characterized in that the cross-sectional area of each of the holes is in the range from 0.785 to 314 $mm^2$ and the pitch thereof is 1 mm or larger.

The unexpanded layer is generated when a resin composition as a raw material filled, for instance, in a cavity of a die contacts a cavity surface of the die and rapidly expands inside the cavity.

The expanded layer is one with voids generated inside a resin or the like due to the spring back phenomenon occurring when the resin or the like as a raw material is injection-molded.

The hole may have any shape such as cylindrical, elliptical, polygonal-columnar, conical ones. Any shape of the hole is allowable on the condition that the hole pass through of the unexpanded layers and does not reach the other one of the layers. When the hole passes through both of the two unexpanded layers, sometimes the sound absorbing capability is not provided.

The cross-sectional area of the hole as mentioned herein indicates a cross-sectional area of the hole on a surface of one of the unexpanded layers. The cross-sectional area of the hole is in the range from 0.785 to 314 $mm^2$. When the cross-sectional area is less than 0.785 $mm^2$, sometimes sounds having a selected high frequency may not be absorbed. When the cross-sectional area of the hole is over 314 $mm^2$, sometimes sounds having a selected low frequency may not be absorbed. When a cross section of the hole has a circular shape, an inner diameter of the hole should preferably be in the range from 1 to 20 mm.

The pitch as mentioned herein indicates a shortest distance between outer peripheries of adjoining holes. Namely the pitch is not limited to a space between holes regularly provided with a predetermined gap, and includes that between adjoining two holes among those irregularly arranged. When the pitch is less than 1 mm, sometimes sounds having a selected high frequency may not be absorbed.

With the present invention as described above, when unexpanded layers and an expanded layer are provided, the unexpanded layer has the sound insulating capability, while the expanded layer has a number of voids therein and therefore has the sound absorbing capability. Because of the reason as described above, both the sound absorbing capability and sound insulating capability can be ensured by integral molding without the need of laminating a plurality of materials together.

Further, a plurality of holes with a depth that passes through one of the unexpanded layers and does not reach the other one are formed at any positions of the molded body, and in addition a cross-section area of the hole is in the range from 0.785 to 314 mm and the pitch is 1 mm or larger, so that sounds with a specific frequency can selectively be absorbed, and therefore only unpleasant sounds can selectively be absorbed. Namely, a frequency of absorbed sounds becomes higher as a cross-sectional area of the hole becomes larger or the pitch becomes larger. Therefore, by selecting a cross-sectional area or a pitch in the range described above, it is possible to select a frequency of sounds to be absorbed, so that only unpleasant sounds can selectively be absorbed.

In the sound absorbing body according to the present invention, it is preferable to prepare two or more types of a cross-sectional area of the hole and/or a pitch between the holes.

With this configuration, as there are two or more types of cross-sectional areas of the hole and/or pitches between the holes, it is possible to widen a frequency range of sounds to be absorbed selectively, so that unpleasant sounds can be absorbed in a wider frequency range.

In the sound absorbing body according to the present invention, the thickness of at least one of the unexpanded layers should preferably be in the range from 0.5 to 2.0 mm, and more preferably in the range from 0.5 to 1.0 mm.

When the thickness of at least one of the unexpanded layers is less than 0.5 mm, sometimes the practical sound insulating capability may not be provided. When the thickness of at least one of the unexpanded layers is over 2.0 mm, sometimes the sufficient sound absorbing capability may not be provided.

In the sound absorbing body according to the present invention, the expanded layer should preferably have a plurality of regions having different expansion rates respectively.

Generally, when the plurality of regions have different expansion rates, the sound absorbing capability and strength of each region are different from those of other regions. Therefore, with the configuration, as the expanded layer has a plurality of regions having different expansion rates respectively, it is possible to realize different sound absorbing capabilities and strengths in different portions of one sound absorbing body.

In the sound absorbing body according to the present invention, the plurality of regions should preferably include those with a high expansion rate in the range from 1.2 to 3.0 times.

When the expansion rate is less than 1.2 times, sometimes the sound absorbing capability may be insufficient. When the expansion rate is over 3.0 times, the strength of the sound absorbing body becomes lower, and sometimes the sound absorbing body may be broken in use or during installation, and also the installation work itself or the like may become difficult.

In the sound absorbing body according to the present invention, the holes should preferably be formed in the regions having a high expansion rate.

With the configuration, as the holes are formed in regions with high expansion rates, the high sound absorbing capability can be realized in the high expansion rate regions, and therefore it is required only to form high expansion rate regions only in a section where sounds should be absorbed. Because of the feature, the present invention is advantageous when it is required to absorb sounds in a relatively small portion.

The sound absorbing structural body according to the present invention is that used in applications requiring the sound absorbing capability, and includes the sound absorbing body as described above, and is used as a cylinder head, a timing belt cover, an air cleaner, an air duct, an engine cover, a resonator for air absorption or exhaustion, an intake manifold, a shielding plate for an engine room or a chamber, and a trunk room.

In this invention, as the sound absorbing structural body includes the sound absorbing body as described above, it is possible to provide, with the sound absorbing structural body, a cylinder head, a timing belt cover, an air cleaner, an air duct, an engine cover, a resonator for air absorption or exhaustion, an intake manifold, a shielding plate for an engine room or a chamber, a trunk room, and the like each having the effects and advantages as described above.

In the sound absorbing structural body according to the present invention, of the angles formed by the direction in which sonic waves propagate and a surface of the unexpanded layer, a smaller one should preferably be in the range from 60 to 90 degrees.

When the angle formed by the direction in which sonic waves propagate and a surface of the unexpanded layer is less than 60 degrees, sonic wave does not come into the hole, and sometimes the sufficient sound absorbing capability may not be realized. Further, the efficiency of selectively absorbing sounds within a specified frequency range may become lower.

In a method of manufacturing a sound absorbing body according to the present invention, with a die having a movable die which can move into or out from an internal cavity of the die, a fiber-containing thermoplastic resin containing reinforcing fiber with the length set in the range from 2 to 100 mm is melted and injected into a cavity of the die, and then the movable die is moved back to allow expansion of the cavity for forming voids in the fiber-containing thermoplastic resin, thus a molded body having two unexpanded layers and one expanded layer held between these unexpanded layers and having a number of voids therein is molded, and then a plurality of holes of a depth that passes through one of the unexpanded layers and does not reach the other one of the unexpanded layers are formed at any positions on the molded body, and a cross-sectional area of the hole is in the range from 0.785 to 314 mm$^2$ with the pitch of 1 mm or larger.

As a raw material, the fiber-containing thermoplastic resin containing reinforcing fiber with the length set in the range from 2 to 100 mm may be used singly as resin pellets, or a mixture of resin pellets and other material(s) may be used as the raw material.

As for the blending ratio in the fiber-containing thermoplastic resin, a content of the thermoplastic resin is preferably in the range from 40% by weight to 98% by weight, while that of the fiber filler is preferably in the range from 2% by weight to 60% by weight.

When the content of the thermoplastic resin is lower than 40% by weight and that of the fiber filler is over 60% by weight, a filling rate of the fiber filler increases with the fluidity degraded, and the molding work may become complicated. On the other hand, when a content of the thermoplastic resin is over 98% by weight and that of the fiber filler is less than 2% by weight, a quantity of other filling components such as the fiber filler becomes smaller, and the sufficient strength can not be obtained, the characteristics such as the damping capability may be lost with the resin hardly expanding, and in that case improvement of the sound absorbing capability may not be achieved.

Further, the fiber-containing thermoplastic resin is preferably used singly as fiber-reinforced resin pellets prepared by mixing reinforcing fiber at a mixing rate in the range from 10% by weight to 90% by weight in a thermoplastic resin in the substantially parallel state and having the length in the range from 2 mm to 100 mm, or is preferably diluted with other thermoplastic material for use so that a content of the fiber is in the range as described above. With the feature as described above, it is possible to obtain high strength, to improve the easiness in production and durability and also to maintain the diameter and fiber length allowing sufficient expansion, so that the sound insulating capability can be improved.

When a blending ratio of the reinforcing fiber in the fiber-reinforced resin pellets is smaller than 10% by weight or when a length of the fiber-reinforced resin pellets is shorter than 2 mm, the sufficient strength of the reinforcing fiber can not be obtained, the strength and sound absorbing capability can not be improved. On the other hand, when the blending ratio of the reinforcing fiber is over 90% or when the length of the fiber-reinforced resin pellet is longer than 100 mm, production of the fiber-reinforced resin pellets is difficult, and also treatment of the resin pellets as those for injection filling becomes difficult, so that improvement in the productivity can not be realized.

There is not specific restriction over a raw material for the thermoplastic resin, and any of, for instance, polyolefin-based resins such as polypropylene, propylene-ethylene block copolymer, propylene-ethylene random copolymer, polyethylene, or polyethylene-based resins, ABS (acrylonitryle-butadiene-styrene) resins, polychloridevinyl-based resins, polyamide-based resins, polyester-based resins, polyacetal-based resins, polycarbonate-based resins, polyaromatic ether or thioether-based resins, polyaromatic ester-based resins, polysulfone-based resins, and acrylate-based resins may be employed. Further, to provide the crashproof capability, a thermoplastic elastomer such as ethylene-propylene rubber (EPR), ethylene-butene copolymer elastomer (EBR), styrene-ethylene-butylene-styrene block copolymer (SEBS) and the like may be used together.

Any of the thermoplastic resins may be used singly, but two or more of the thermoplastic resins may be used in combination. It is to be noted that various types of polymer materials capable of being injection-molded such as any of the thermoplastic resins with other filler such as talc and various types of additives mixed therein may be employed.

Of the thermoplastic resins as enlisted above, polypropylene-based resins such as polypropylene, block copolymer of propylene and other olefin, random copolymer, and a mixture of the materials are preferable, and especially polypropylene-based resins containing an acid denatured polyolefin-based resin denatured by unsaturated carboxylic acid or a derivative thereof can advantageously be used.

Further, as the other inorganic filler, any of talc, calcium carbonate, barium sulfate, clay, mica and the like is used, and the material may be used singly or in combination with other material(s).

As the reinforcing fiber, any of ceramic fiber such as rock wool or boron fiber, inorganic fiber such as glass fiber or carbon fiber, metallic fiber such as aluminum fiber or copper fiber, organic fiber such as ultra high molecular weight polyethylene fiber, aramid fiber or polyacrylate fiber and the like may be employed. Employment of glass fiber is especially preferable.

As for the procedure for manufacturing the molded body, the known technology disclosed, for instance, in Japanese Patent Laid-Open Publication No. Hei 12-52371 may be employed. And, the molded body can be molded by using the die, injection molding machine and others described in the publication.

As a method for forming holes, there can be enlisted, for instance, the method of forming holes by sticking a pin into the molded body and the method of forming holes on and from a surface of the molded body with a drill or the like.

The process of manufacturing a molded body and the process of forming holes may be carried out continuously, or after a molded body is manufactured, the process of forming holes may be carried out as a different process from that for manufacturing a molded body.

With the present invention as described above, by molding a molded body including unexpanded layers and an expanded layer, the unexpanded layers have the sound insulating capability, while the expanded layer has a number of voids therein and therefore has the sound insulating capability. Therefore, both the sound absorbing capability and the sound insulating capability can be secured by integral molding without laminating a plurality of materials together.

A plurality of holes of a depth that passes through one of the unexpanded layers and does not reach the other one of the unexpanded layers are formed at any positions on the molded body, a cross-sectional area of the hole is in the range from 0.785 to 314 $mm^2$, and the pitch is 1 mm or larger, so that sounds with a specified frequency can selectively be absorbed, and therefore only unpleasant sounds can selectively be absorbed.

In a method of manufacturing the sound absorbing body according to the present invention, with a die having a movable die which can move into or out from an internal cavity of the die, a fiber-containing thermoplastic resin containing reinforcing fiber with the length set in the range from 2 to 100 mm is melted and injected into a cavity of the die, and then the movable die is moved back to allow expansion of the cavity for forming voids in the fiber-containing thermoplastic resin, thus a molded body having two unexpanded layers and one expanded layer held between these unexpanded layers and having a number of voids therein is molded, and a region having a different expansion ratio from that of the peripheral area is formed in a section corresponding to the cavity forming surface of the expanded layer, and a plurality of holes of a depth that passes through one of the unexpanded layers and does not reach a second unexpanded layer are formed at any positions of the molded body, a cross-sectional area of the hole is in the range from 0.785 to 314 $mm^2$, and the pitch is 1 mm or larger.

As for the procedure for manufacturing the molded body, the known technology disclosed, for instance, in Japanese Patent Laid-Open Publication No. Hei 11-170290 may be employed. The molded body can be molded by using the die, the injection molding machine, and the like described in the publication. The method of forming the holes is as described above.

With the procedure as described above, the same effects and advantages as those provided by the method of manufacturing the sound absorbing body as described above can be obtained.

Further, by forming a region having a different expansion ratio from that of the peripheral area is formed in a portion corresponding to the cavity forming surface of the expanded layer, the expanded layer has a plurality of regions each having a different expansion ratio, so that the different sound absorbing capabilities and different strengths can be realized at different positions in one sound absorbing body because the expanded layer varies the sound absorbing capability and strength according to the expansion ratio.

With the method of manufacturing a sound absorbing body according to the present invention, the holes are preferably formed after the molded body is molded.

With this feature, since holes each having a specified cross-sectional area at specified positions can be performed by forming the holes after the molded body is molded, it is possible to accurately realize the sound absorbing capability of a sound absorbing body.

The method of manufacturing a sound absorbing structural body according to the present invention is one for manufacturing a sound absorbing structural body used in applications requiring the sound absorbing capability, and is characterized in that a plurality of divided bodies obtained by dividing a cylindrical molded body and having holes of a depth that does not pass through the molded body is formed by the method of manufacturing the sound absorbing body as described above, and the plurality of divided bodies are adjoined together to form an integral body with the opposite faces of the plurality of divided bodies facing to each other.

With this feature, as the sound absorbing structural body is molded with the method of manufacturing a sound absorbing body as described above, both the sound absorbing capability and sound insulating capability can be secured. Further, holes are formed on an inner side of the cylindrical molded body, it is possible to manufacture a sound absorbing structural body required to absorb sounds therein in use.

In the method of manufacturing a sound absorbing structural body according to the present invention, the method of adjoining the divided bodies described above is preferably any of the Die Slide Injection process, Die Rotary Injection process, vibration welding, hot-plate welding, or laser welding.

With the feature as described above, the divided bodies can be adjoined to each other by using any of the methods described above without causing displacement between the adjoining faces or the like. Therefore, the sound absorbing capability can be securely realized.

BRIEF DESCRIPTION OF DRAWINGS

FIG. 4 is a partially lacked perspective view showing an inlet system according to a second embodiment of the present invention;

BEST MODE FOR CARRYING OUT THE INVENTION

Embodiments of the present invention are described below with reference to the related drawings.

First Embodiment

A first embodiment of the present invention is described below with reference to the related drawings.

Figure 1:
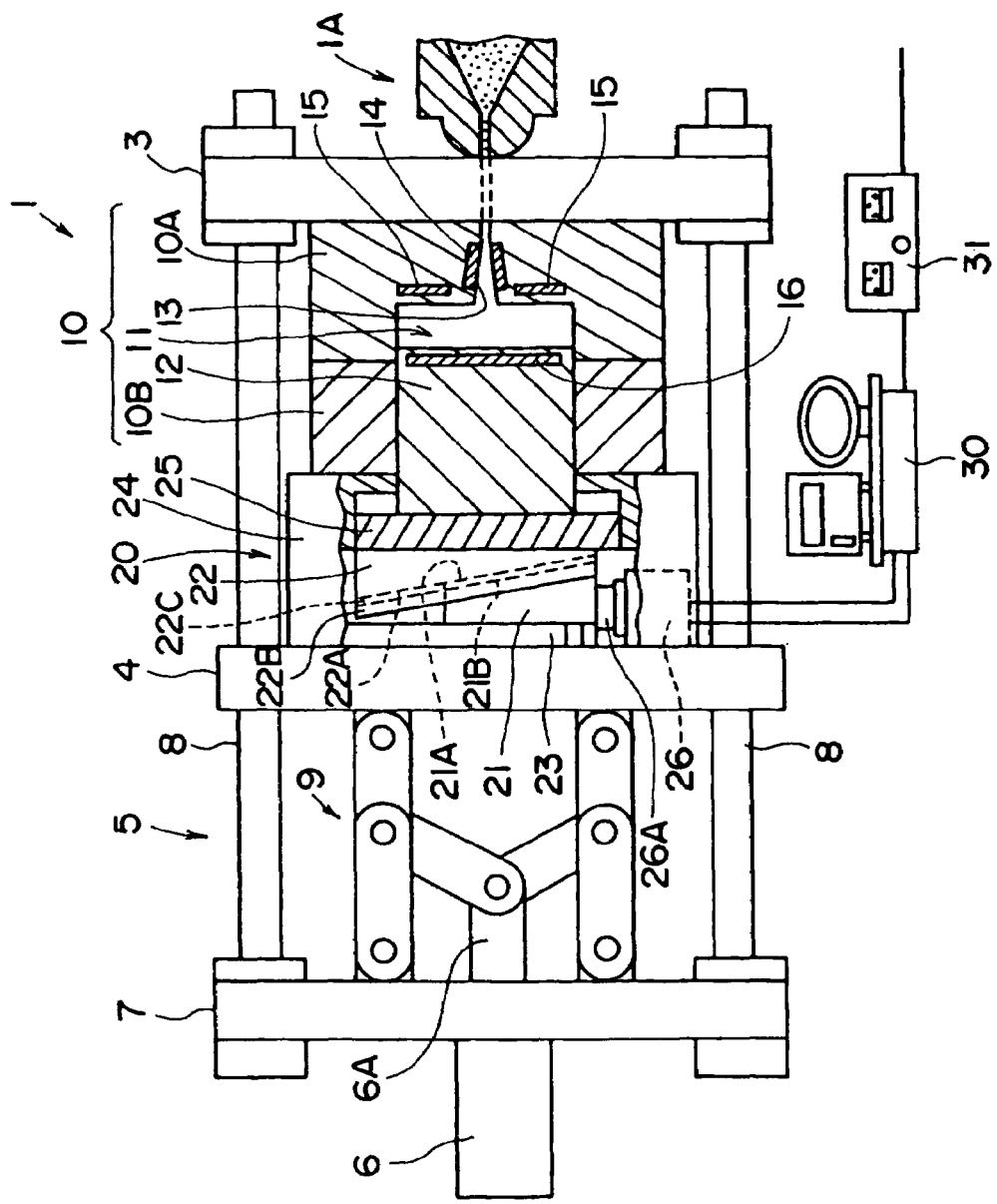
FIG. 1 is a schematic diagram showing an injection molding machine according to a first embodiment of the present invention.

FIG. 1 shows an injection molding machine 1 for molding a molded body according to this embodiment. The injection molding machine 1 is used for injecting melted resin into a die 10 for molding.

A die 10 is divided to a fixed die 10A and a movable die 10B. Provided in the movable die 10B of this die 10 is a movable core 12 capable of moving in and out of a cavity 11 of the die 10. By moving this movable core 12, the cavity 11 of the die 10 can change the capacity.

A path 13 for a spool, a runner and the like is formed in the fixed die 10A of the die 10 to introduce the melted resin into inside thereof. A belt-shaped electrothermic body 14 is provided around the path 13. With this configuration, the path 13 forms the so-called hot runner to prevent the melted resin flowing inside the path 13 from being cured.

Further, provided in the fixed die 10A and movable core 12 are electrothermic bodies 15, 16 embedded near each of the molding surfaces thereof. By adjusting a heat value of each of these electrothermic bodies 15, 16, a temperature of each of the molding surfaces of the fixed die 10A and the movable core 12 is adjusted to a predetermined value.

Further, in the fixed die 10A, a gas pin (not shown) is provided so that the gas pin can protrude into and retroject from the cavity 11 for pouring pressurized gas into the melted resin injected into the cavity 11.

The injection molding machine 1 includes an injection device 1A for injecting melted resin into the cavity 11 of the die 10, a fixed die plate 3 with the fixed die 10A fixed thereto, a movable die plate 4 with the movable die 10B fixed thereto, a die clamping device 5 for moving the movable die plate 4 toward the fixed die plate 3, and a die moving device 20 for moving the movable core 12 of the die 10 to any position within a predetermined range and also for stopping the movable core 12 at the position.

The movable die plate 4 is slidably provided and capable of sliding along a tie bar 8 spanned between a fixed plate 7 with a hydraulic cylinder device 6 for die clamping and the fixed die plate 3.

The die clamping device 5 has a toggle mechanism 9 with a piston rod 6A of the hydraulic cylinder device 6 jointed thereto, and moves the movable die plate 4 forward by increasing a pressing force of the hydraulic cylinder device 6 with the toggle mechanism 9 to tightly contact the movable die 10B to the fixed die 10A for closing the die 10.

The die moving device 20 loads a compressing force to the melted resin injected into the cavity 11 by moving forward the movable core 12 into the cavity 11 and expands the cavity 11 by moving backward the movable core 12, and is provided between the movable die plate 4 and the movable die 10B.

The die moving device 20 is also a cavity clearance changing unit capable of changing a clearance between the molding surface of the movable core 12 and the molding surface of the fixed die 10A by moving forward and backward the movable core 12.

The die moving device 20 includes a pair of inclined members 21, 22 respectively having inclined faces 21A, 22A inclined relative to the moving direction of the movable core 12 respectively with the inclined faces 21A, 22A contacting to each other, a base plate 23 having a flat surface perpendicular to the moving direction of the movable core 12, a die mounting base 24 for jointing the movable die plate 4 and the movable die 10B, and a compressing plate 25 for jointing the movable core 12 and the inclined member 22.

Of these components, the inclined member 21 is capable of sliding along a surface of the base plate 23 mounted to the movable die plate 4 and is driven by the hydraulic cylinder device 26 in a direction perpendicular to the moving direction of the movable core 12.

A raised section 22B extending along the moving direction of the inclined member 21 is provided along each of the both edge rims of the inclined surface 22A of the inclined member 22. Provided in the inner side from the raised section 22B is a groove 22C extending in the longitudinal direction of the raised section 22B.

On the other hand, a protrusion 21B to be engaged in the groove 22C on the inclined member 22 is provided on a side face of the inclined member 21 contacting an inner surface of the raised section 22B.

With this configuration, when a piston rod 26A of the hydraulic cylinder device 26 is moved forward, the inclined member 21 presses the inclined member 22 and the movable core 12 moves forward. On the other hand, when the piston rod 26A of the hydraulic cylinder device 26 is moved backward, the inclined member 21 pulls the inclined member 22 and the movable core 12 moves backward.

A hydraulic unit 30 is provided to load a hydraulic pressure to the die moving device 20, and further a control unit 31 is provided for making the die moving device 20 execute a desired operation by controlling the hydraulic unit 30.

The control unit 31 has a sequence control circuit such as a digital sequencer, and can make the movable core 12 execute any of specified operations such as moving into and out of the cavity 11 step by step, stopping at a specified position, then moving backward and the like in succession.

Although not shown in the figure, a pressurized gas feed unit such as a gas cylinder for feeding pressurized gas to a gas pin (not shown) provided on the fixed die 10A is provided near the injection molding machine 1.

Figure 2A:
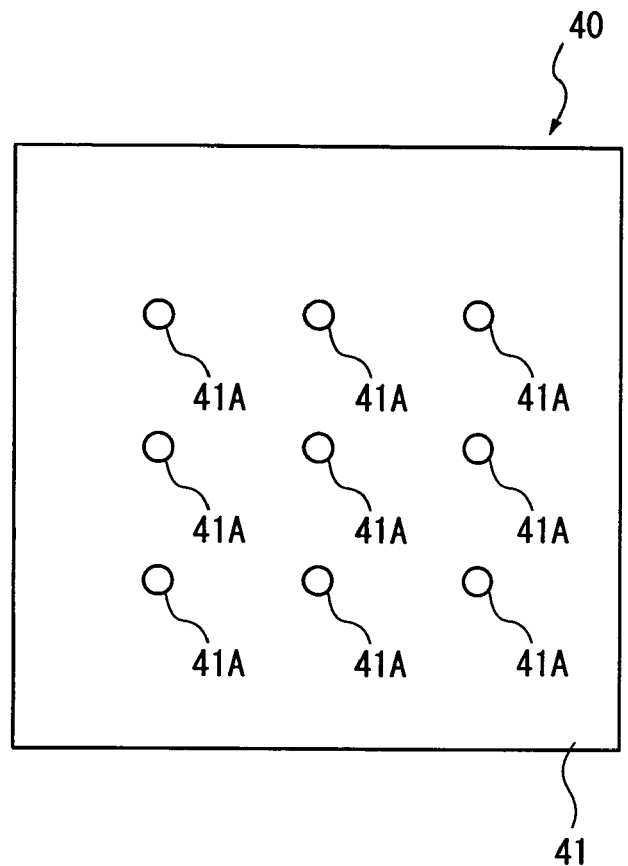
FIG. 2(A) is a plan view and FIG. 2(B) is a cross-sectional view each showing a molded body in the first embodiment.
Figure 2B:
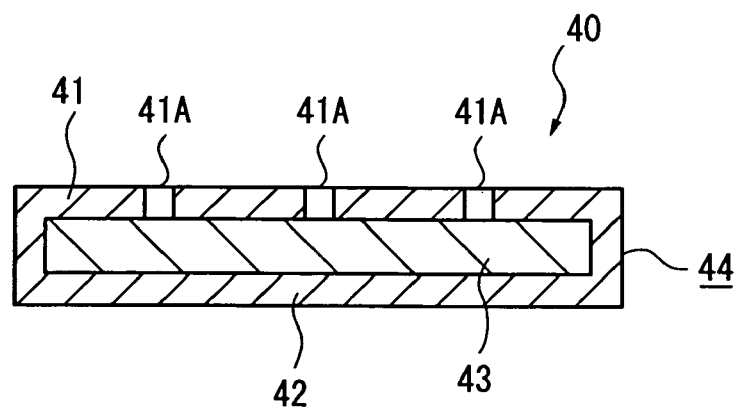

FIG. 2 (A) is a plan view showing a sound absorbing body 40. FIG. 2(B) is a cross-sectional view showing the sound absorbing body 40. The sound absorbing body 40 has a molded body 44. The molded body 44 includes two unexpanded layers 41, 42, and an expanded layer 43 held between these unexpanded layers 41, 42 and having a number of voids therein. The unexpanded layers 41, 42 are layers prepared by curing melted resin containing reinforcing fiber without expanding the resin and having high density and high rigidity. The thickness of the unexpanded layer 41 is the substantially same as that of the unexpanded layer 42.

The thickness of the unexpanded layers 41, 42 is in the range from 0.5 to 2.0 mm. When the thickness of the unexpanded layers 41, 42 is less than 0.5 mm, sometimes the practical sound insulating capability may not be obtained. When the thickness of the unexpanded layers 41, 42 is over 2.0 mm, sometimes the sufficient sound absorbing capability may not be realized.

On the other hand, the expanded layer 43 is a layer prepared by curing the melted resin containing reinforcing fiber therein in the state when a number of voids due to the spring back phenomenon have been generated, and has a number of voids therein and excellent sound absorbing capability.

The expanded layer 43 has an expansion ratio of 1.2 to 3.0 times. When the expansion ratio is less than 1.2 times, sometimes the sound absorbing capability may be insufficient. When the expansion ratio is over 3.0 times, the strength of the sound absorbing body drops, and in that case, the sound absorbing body may be broken, for instance, in use or during installation, and such works as installation thereof may become difficult.

A plurality of circular holes 41A of a depth that passes through the unexpanded layer 41 and does not reach the unexpanded layer 42 are formed at any positions of the molded body 44. In this embodiment, the hole 41A has a depth equal to that of the unexpanded layer 41. A cross-sectional area of the hole 41A is in the range from 0.785 to 314 $mm^2$, and the pitch is 1 mm or larger. In this embodiment, the hole 41A is circular, so that an inner diameter of the hole 41A is in the range from 1 to 20 mm. When the cross-sectional area of the hole 41A is less than 0.785 $mm^2$, sometimes sounds with a selected high frequency may not be absorbed. When the cross-sectional area of the hole 41A is less than 314 $mm^2$ (Translator's comment: over 314 $mm^2$), sometimes sounds with a selected low frequency may not be absorbed.

The procedure for molding the molded body 44 according to this embodiment is described below.

At first, the die 10 and the die moving device 20 are set in the general type of injection molding machine 1 as shown in FIG. 1 and a specified raw material is injected into a not-illustrated hopper.

Then, the die 10 is set in the injection molding machine 1 and resin pellets are fed into the cavity 11 of the injection device 1A, and then the injection molding machine 1 is started to start plasticizing and kneading the resin pellets in the cavity 11.

As the raw material, fiber-containing thermoplastic resin containing reinforcing fiber with the length in the range from 2 to 100 mm may be used singly as resin pellets, or a mixture of the resin pellets with other molding material(s) may be used.

As for a blending ratio in the fiber-containing thermoplastic resin, a content of the thermoplastic resin should preferably be in the range from 50 weight % to 98 weight %, while a content of the fiber filler should preferably be in the range from 2 weight % to 50 weight %.

When a content of the thermoplastic resin is less than 50 weight % and that of the fiber filler is over 50 weight %, a fill ration of the fiber filler is too larger with the fluidity degraded, and sometimes the molding work may become too complicated. On the other hand, when a content of the thermoplastic resin is over 98% and that of the fiber filler is less than 2 weight %, a quantity of other filler materials such as a fiber filler becomes too small and the sufficient strength is not obtained, so that the characteristics such as the damping capability is lost and the thermoplastic resin hardly expands, and therefore sometimes improvement in the sound absorbing capability can not be realized.

Further, the fiber-containing thermoplastic resin is prepared by mixing reinforcing fiber at a blending ratio in the range from 10 weight % to 90 weight % in the substantially parallel state and is used singly as fiber-reinforced resin pellets with the length in the range from 2 mm to 100 mm, or is preferably diluted with other thermoplastic material in use to realize the content of fiber as described above. With this, the high strength is obtained with the productivity and durability improved, and also it becomes easier to maintain a diameter and fiber length allowing sufficient expansion, and therefore the sound absorbing capability can be improved.

When a blending ratio of reinforcing fiber in the fiber-reinforced resin pellets is less than 10 weight %, or when the length of the fiber-reinforced resin pellets is shorter than 2 mm, the sufficient effect for strengthening with the reinforcing fiber can not be obtained, and improvement in strength and sound absorbing capability can not be improved. On the other hand, when the blending ratio of the reinforcing fiber is over 90%, or when the length of the fiber-reinforced resin pellets is longer than 100 mm, production of the fiber-reinforced resin pellets becomes difficult, and also the fiber-reinforced resin can hardly be treated as pellets for injection and filling, so that improvement in the productivity can not be realized.

Although there is no specific restriction for the thermoplastic resin, for instance, polyolefin-based resins such as polypropylene, propylene-ethylene block copolymer, propylene-ethylene random copolymer, polyethylene, or polyethylene-based resins, ABS (acrylonitryle-butadiene-styrene) resins, polychloridevinyl-based resins, polyamide-based resins, polyester-based resins, polyacetal-based resins, polycarbonate-based resins, polyaromatic ether or thioether-based resins, polyaromatic ester-based resins, polysulfone-based resins, and acrylate-based resins may be employed. Further, to provide the crashproof capability, a thermoplastic elastomer such as ethylene-propylene rubber (EPR), ethylene-butene copolymer elastomer (EBR), styrene-ethylene-butylene-styrene block copolymer (SEBS) and the like may be used together.

These thermoplastic resins may be used singly, but two or more types of thermoplastic resins may be used in combination. It is to be noted that various types of polymer materials capable of being injection-molded such as any of the thermoplastic resins with other filler such as talc and various types of additives mixed therein may be employed.

Of the thermoplastic resins as enlisted above, polypropylene-based resins such as polypropylene, block copolymer of propylene and other olefin, random copolymer, and a mixture of the materials are preferable, and especially polypropylene-based resins containing an acid denatured polyolefin-based resin denatured by unsaturated carboxylic acid or a derivative thereof can advantageously be used.

Further, as the other inorganic filler, any of talc, calcium carbonate, barium sulfate, clay, mica and the like is used, and the material may be used singly or in combination with other material(s).

As the reinforcing fiber, any of ceramic fiber such as rock wool or boron fiber, inorganic fiber such as glass fiber or carbon fiber, metallic fiber such as aluminum fiber or copper fiber, organic fiber such as ultra high molecular weight polyethylene fiber, aramid fiber or polyacrylate fiber and the like may be employed. Employment of glass fiber is especially preferable.

In the cavity 11, the resin pellets are sufficiently plasticized and kneaded while suppressing breakage of the fiber to obtain a quantity of melted rein required for molding the molded body 44 and also to homogeneously disperse a number of glass fiber pieces within the melted resin and also entangle the fiber pieces sufficiently with each other so that the spring back phenomenon easily occurs.

Figure 3A:
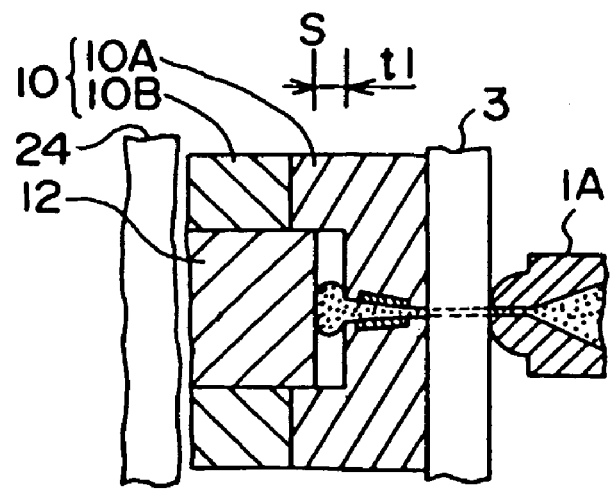
FIGS. 3A-C are an illustration illustrating a procedure of molding in the first embodiment.

Then, the electrothermic bodies 15, 16 are actuated so that a temperature at a molding surface of the movable core 12 is higher than that on a molding surface of the fixed die 10A, and then the die clamping device 5 is actuated to move the movable die plate 4 to the fixed die plate 3 so that the fixed die 10A is contacted to the movable die 10B as shown in FIG. 1 to close the die 10, and also the die moving device 20 is actuated to move the movable core 12 to the position S as shown in FIG. 3(A) to set the thickness of the cavity 11 to t1. In this state, injection of melted resin is performed.

In this step, the thickness t1 of the cavity 11 formed by the movable core 12 having been moved to and stopped at the position S is set so that the capacity of the cavity 11 with the thickness t1 is larger than a quantity of injected melted resin.

Figure 3B:
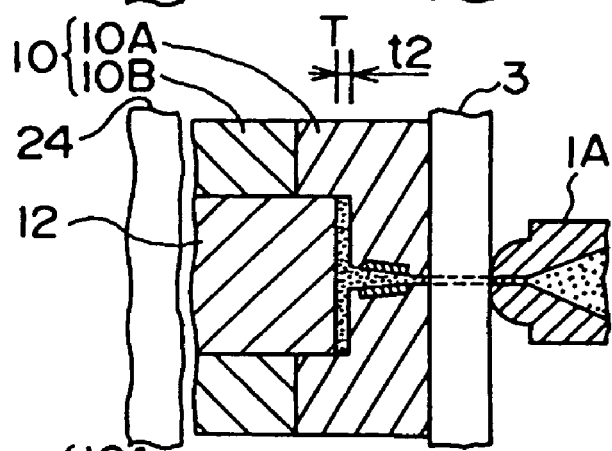

After injection of the melted resin is started, the die moving device 20 is actuated to move forward the movable core 12 to the position T as shown in FIG. 3(B) to set the thickness of the cavity 11 to t2. With this operation, the capacity of the cavity 11 is made smaller to compress the melted resin injected into the cavity 11.

In this step, the unexpanded layers 41, 42 of the molded body 44 can be adjusted by increasing or reducing the time required from start of injection of the melted resin until backward movement of the movable core 12 is started. In other words, the thickness of the unexpanded layers 41, 42 becomes larger by prolonging the elapsed time, and therefore the elapsed time is set so that the thickness of the unexpanded layers 41, 42 is a desired value.

Figure 3C:
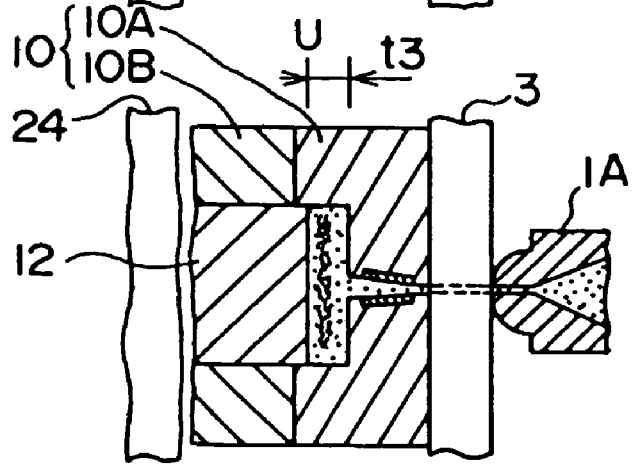

After the movable core 12 has been moved to the position T, the die moving device 20 is operated in the reverse direction to move backward the movable core 12 to the position U as shown in FIG. 3(C) so that the cavity 11 has a capacity corresponding to a molded body to set the thickness of the cavity 11 to t3 for causing the spring back phenomenon.

Then, pressurized gas is poured into the melted resin from a gas pin provided in the fixed die 10A moving backward the movable core 12 to promote the spring back phenomenon, if needed.

The move-back speed Vr of the movable core 12 can be set in the range from 0.05 to 100 mm/sec, and preferably in the range from 0.05 to 50 mm/sec.

When the movable core 12 is moved backward, the melted resin expands due to the spring back phenomenon with an elastic restoring force of glass fiber having been compressed in the melted resin and a number of voids are generated inside the resin, and thus the expanded layer 43 being formed.

When a period of time required for sufficiently cooling down the molded body 44 has passed, the die clamping device 5 is actuated to move backward the movable die plate 4 for opening the die 10. Then, the molded body 44 is taken out from inside of the die 10 to complete molding. Later the molding steps as described above are repeated according to the necessity.

Then, the unexpanded layer 41 is pierced at any positions of the molded body 44 with a heated pin or the like to form a number of circular holes 41A of a depth that passes through the unexpanded layer 41 and does not reach the unexpanded layer 42. As described above, a cross-sectional area of the hole 41A is in the range from 0.785 to 314 $mm^2$, and the pitch is 1 mm or more and preferably in the range from 10 to 200 mm. When the holes as described above are formed in the molded body 44, the sound absorbing body 40 is completed.

With the embodiment as described above, the following advantages can be obtained.

(1) By providing the unexpanded layers 41, 42 and the expanded layer 43, the unexpanded layers 41, 42 have the sound insulating capability, while the expanded layer 43 has the sound absorbing capability with a number of voids therein. Because of this feature, both the sound absorbing capability and sound insulating capability can be secured by integral formation without laminating a plurality of materials.

(2) A number of holes of a depth that passes through the unexpanded layer 41 and does not reach the unexpanded layer 42 are formed at any positions of the molded body 44, and a cross-sectional area of the hole 41A is in the range from 0.785 to 314 $mm^2$, and the pitch is 1 mm or more, so that sounds with any frequency can selectively be absorbed, and therefore only unpleasant sounds can selectively be absorbed.

Second Embodiment

Next a second embodiment of the present invention is described. It is to be noted that, in the following description, the same reference numerals are assigned to the same components as those already explained above and the description thereof is omitted herefrom.

Figure 5:
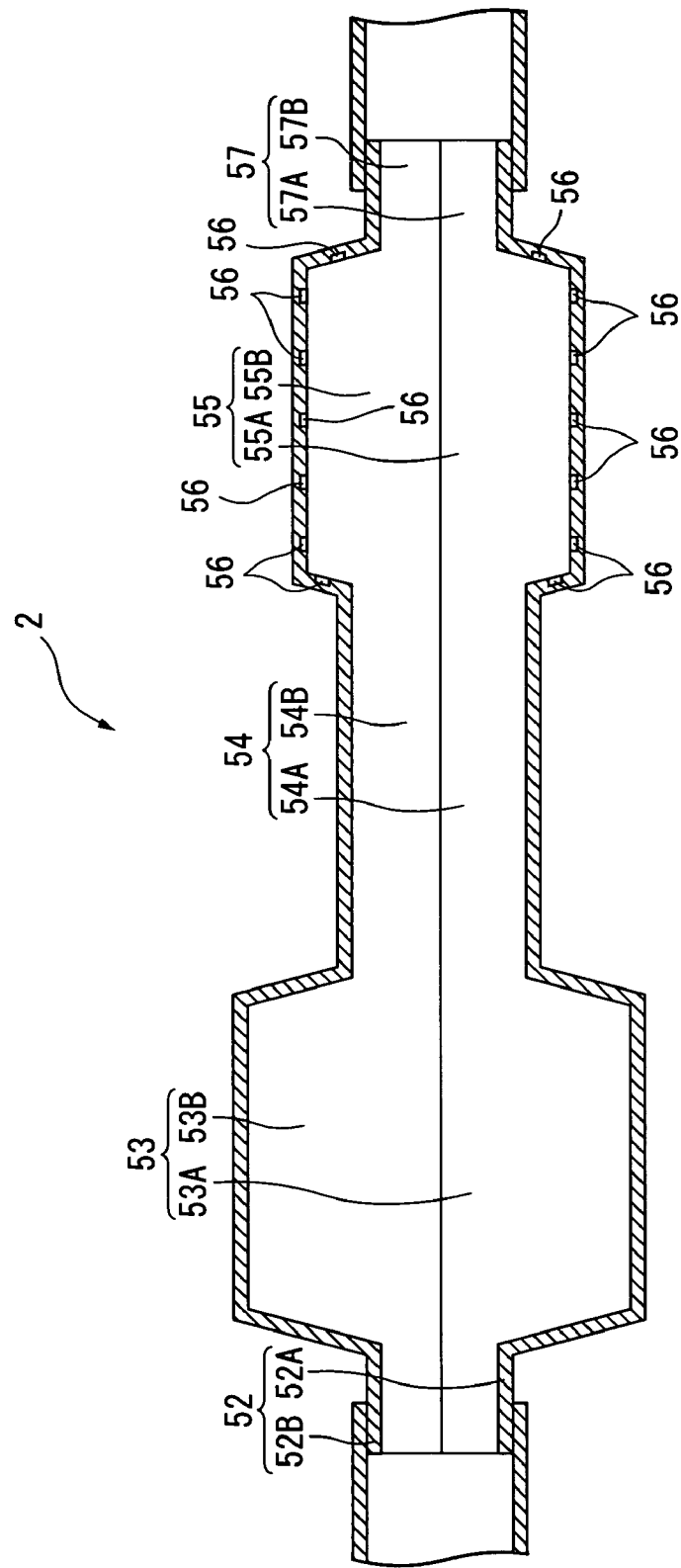
FIG. 5 is a cross-sectional view showing the inlet system according to the second embodiment.

In FIG. 4 and FIG. 5, an inlet system 2 as a sound absorbing structural body is provided in an air intake side of a not-illustrated internal combustion engine such as an engine of an automobile.

The inlet system 2 has an upstream engaging section 52 having a substantially cylindrical shape.

Further, provided in the inlet system 2 is an air cleaner 53 having a substantially cylindrical shape as an air cleaning section and integrated with the upstream engaging section 52. This air cleaner 53 accommodates therein, for instance, a not-illustrated filter having the air permeability, and this filter allows passage of air flowing therethrough and captures and removes dusts and the like mixed in the air. Further, provided in the inlet system 2 is a duct section 54 and integrated with the air cleaner and having a substantially cylindrical shape.

Further, provided in the inlet system 2 is a resonator 55 having a substantially cylindrical shape and integrated with the duct section 54 as a resonating section. This resonator 55 absorbs sounds caused by resonation or interference.

The resonator 55 has a plurality of circular holes 56 opening inward on an internal surface thereof.

A cross section of the hole 56 is in the range from 0.785 to 314 $mm^2$. The pitch between the holes 56 is 1 mm or larger, and preferably in the range from 10 mm to 200 mm. It is to be noted that the holes 56 do not pass through from the external surface to the internal surface of the resonator 55. An internal diameter of the hole 56 is in the range from 1 to 20 mm.

When an internal diameter of the hole 56 is smaller than 1 mm, interference to noises by the holes 56 is insufficient, and sometimes the sufficient sound absorbing capability may not be obtained. When an internal diameter of the hole 56 is larger than 20 mm, the strength decreases and the resonator may be broken during the production process, in installation, or in use.

Further, the inlet system 2 has a downstream engaging section 57 having a substantially cylindrical shape and integrated with the resonator 55. This downstream engaging section 57 is jointed to the internal combustion engine.

The inlet system 2 separates and removes dusts from air introduced from the upstream engaging section 52 with the air cleaner 53. The air with the dust having been separated and removed therefrom flows into the resonator 55 via the duct section 54, and goes into the internal combustion engine from the downstream engaging section 57 with sounds absorbed thereby.

Further, in the inlet system 2, a lower module piece 60 and an upper module piece 61 having a substantially symmetrical shape are provided and jointed to each other to form a substantially cylindrical shape.

The lower module piece 60 has a lower air cleaning section 53A having a substantially box shape and opened in the upwardly expanding state. Further, a lower upstream engaging section 52A having a shape like a watershoot and opened upward is integrally provided at an edge of the lower air cleaning section 53A in the longitudinal direction. In addition, a watershoot-shaped lower duct section 54A having the substantially same shape as that of the lower upstream engaging section 52A and opened upward is integrally provided at the other edge of the lower air cleaner section 53A in the longitudinal direction.

The lower module piece 60 has a lower resonating section 55A integrated with the lower duct section 54A. This lower resonating section 55A has a substantially box shape in the upwardly expanding state like the lower air cleaning section 53A. The lower resonating section 55A has a plurality of holes 56 opened downward on a lower surface as an external surface thereof.

Further, a lower downstream engaging section 57A is integrally provided at the other edge of the lower resonating section 55A in the lower module piece 60. This lower downstream engaging section 57A has the substantially same shape as that of the lower upstream engaging section 52A and also has a watershoot shape opened upward.

The lower module piece 60 has flange-like lower joint piece sections 60A protruding outward from the upper edge section of the lower module piece 60 and extending along both of the upper edges of the lower upstream engaging section 52A, lower air cleaning section 53A, lower duct section 54A, and lower downstream engaging section 57A respectively.

On the other hand, the upper module piece 61 has the substantially same shape as that of the lower module piece 60, and has an upper upstream engaging section 52B corresponding to the lower upstream engaging section 52A, an upper air clearing section 3B (Translator's comment: 53B) corresponding to the lower air cleaning section 53A, an upper duct section 54B corresponding to the lower duct section 54A, an upper resonating section 5B (Translator's comment: 55B) corresponding to the lower resonating section 55A, and an upper downstream engaging section 57B corresponding to the lower downstream engaging section 57A successively provided in the integrated form. Further, the upper module piece 61 has a flange-like upper joint piece section 61A corresponding to the lower joint piece section 60A of the lower module piece 60 and having the substantially same shape as that thereof.

These lower module piece 60 and upper module piece 61 are prepared by injection-molding a specified material. The materials are the same as those described above in the first embodiment.

The lower module piece 60 and upper module piece 61 respectively have a cross-section with voids, namely, they are formed as porous bodies having a number of voids generated by fine air bubbles therein. In other words, the lower module piece 60 and upper module piece 61 respectively have a cross-sectional structure including two unexpanded layers and an expanded layer held between these unexpanded layers and having a number of voids therein.

The inlet system 2 is formed by jointing the lower joint piece sections 60A of the lower module piece 60 and the upper joint piece section 61A of the upper module piece 61 to each other, for instance, by means of vibration welding so that the open sides of the lower module piece 60 and the upper module piece 61 face to each other, namely so that an upper surface of the lower module piece 60 is covered with a lower surface of the upper module piece 61.

When the lower module piece 60 and the upper module piece 61 are jointed to each other, this inlet system 2 forms the upstream engaging section 52 together with the lower upstream engaging section 52A of the lower module piece 60 and the upper upstream engaging section 52B of the upper module piece 61. The air cleaner 53 is formed with the lower air cleaning section 53A of the lower module piece 60 and the upper air cleaning section 3B (Translator's comment: 53B) of the upper module piece 61. Further, the duct section 54 is formed with the lower duct section 54A of the lower module piece 60 and the upper duct section 54B of the upper module piece 61. The resonator 55 is formed with the lower duct section 54A of the lower module piece 60 and the upper resonating section 5B (Translator's comment: 55B) of the upper module piece 61. Further, the downstream engaging section 57 is formed with the lower downstream engaging section 57A of the lower module piece 60 and the upper downstream engaging section 57B of the upper module piece 61. Then, the inlet system 2 is formed with the upstream engaging section 52, air cleaner 53, duct section 54, resonator 55, and downstream engaging section 57 provided in succession in an integral form to form a substantially cylindrical body.

Next, a process of manufacturing the inlet system 2 according to the embodiment described above is described with reference to the related drawings. At first, the raw materials used in this process are the same as those used in the first embodiment.

Figure 6:
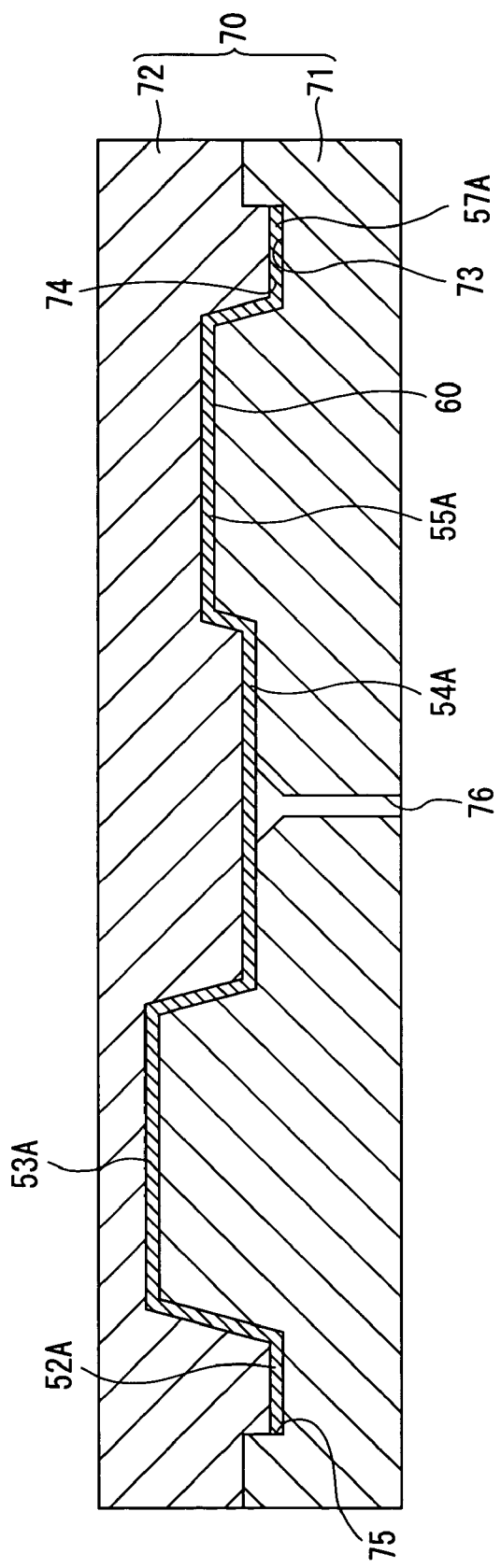
FIG. 6 is a cross-sectional view showing the situation in which a module piece is molded with a die according to the second embodiment.

The prepared raw materials are melted and are injected into a die 70 as shown in FIG. 6. The die 70 has a pair of die frames 71, 72 which can be contacted to and also separated from each other. On the opposite surfaces of the die frames 71, 72, there are provided molding concave sections 73, 74 into which the raw materials are injected respectively. The die 70 including a pair of die frames 71, 72 jointed to each other forms a molding space 75 which is a cavity corresponding to shapes of the lower module piece 60 and upper module piece 61, which are divided bodies, with the molding concave sections 73, 74. Further, the die frame 71 has a gas injection hole 76 through which gas is injected into the molding space 75.

When the injection compression molding method is performed for injecting the raw materials into the die 70, the materials are fed into a not-illustrated injection device and plasticized and kneaded therein so that the raw materials are melted and dispersed in the substantially homogeneous state. Then, the raw materials are compressed to be injected to the molding space 75 of the die 70. The uppermost surface portion of the injected materials contacting with inner surfaces of the molding concave sections 73, 74 of the die frames 71, 72 and is cooled and solidified earlier as compared to the inner portion of the raw materials to form not-illustrated unexpanded layers.

Further, gas such as air or carbon dioxide is injected into the melted raw materials at a high temperature with a high pressure from the gas injection hole 76 with, for instance, a not-illustrated gas injection device. The injected gas permeates into the melted raw materials in the state of super critical gas with a number of air bubbles generated therein. Then, the raw materials are cooled in a predetermined time for solidification. With solidification of the raw materials, the lower module piece 60 and upper module piece 61 are molded by the injection compression molding method.

Figure 7:
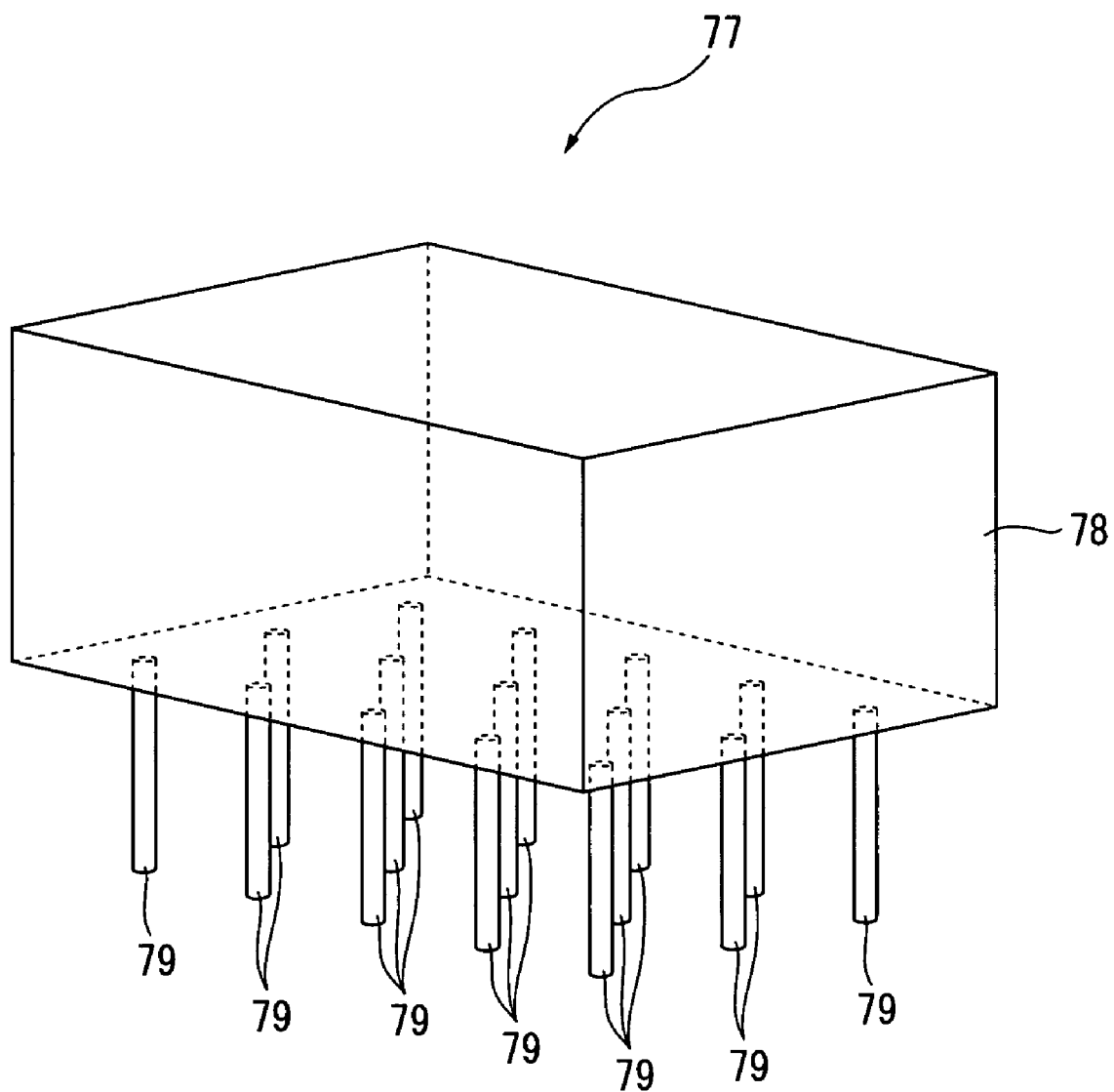
FIG. 7 is a perspective view showing a machining tool used for forming holes according to the second embodiment.

Then, a plurality of holes 56 are formed with a machining tool 77 shown in FIG. 7. The machining tool 77 shown in FIG. 7 has a plurality of protruding pins 79 each with the axial direction extending substantially along the vertical direction and parallel to each other on a lower surface of a base section 78. Then, a plurality of concave holes 56 not passing through the lower module piece 60 nor the upper module piece 61 are formed on opposite surfaces of the plurality of divided bodies, namely on an internal surface of the lower resonating section 55A of the lower module piece 60 as well as on an internal surface of a upper resonating section 55B of the upper module piece 61 to form the inlet system 2.

Of the angles formed by a direction in which sonic waves propagate and a surface of the unexpanded layer, the smaller one should preferably be in the range from 60 to 90 degrees. When the angle formed by the direction in which sonic waves propagate and a surface of the unexpanded layer is less than 60 degrees, sonic waves do not enter the holes, and sometimes the sufficient sound absorbing capability may not be realized.

Then, the lower module piece 60 and upper module piece 61 each formed as described above are placed so that the opposite surfaces of the lower module piece 60 and upper module piece 61 face to each other, and the lower joint piece section 60A of the lower module piece 60 and the upper joint piece section 61A of the upper module piece 61 are welded by means of vibration welding method to integrally joint the lower module piece 60 to the upper module piece 61.

Figure 8:
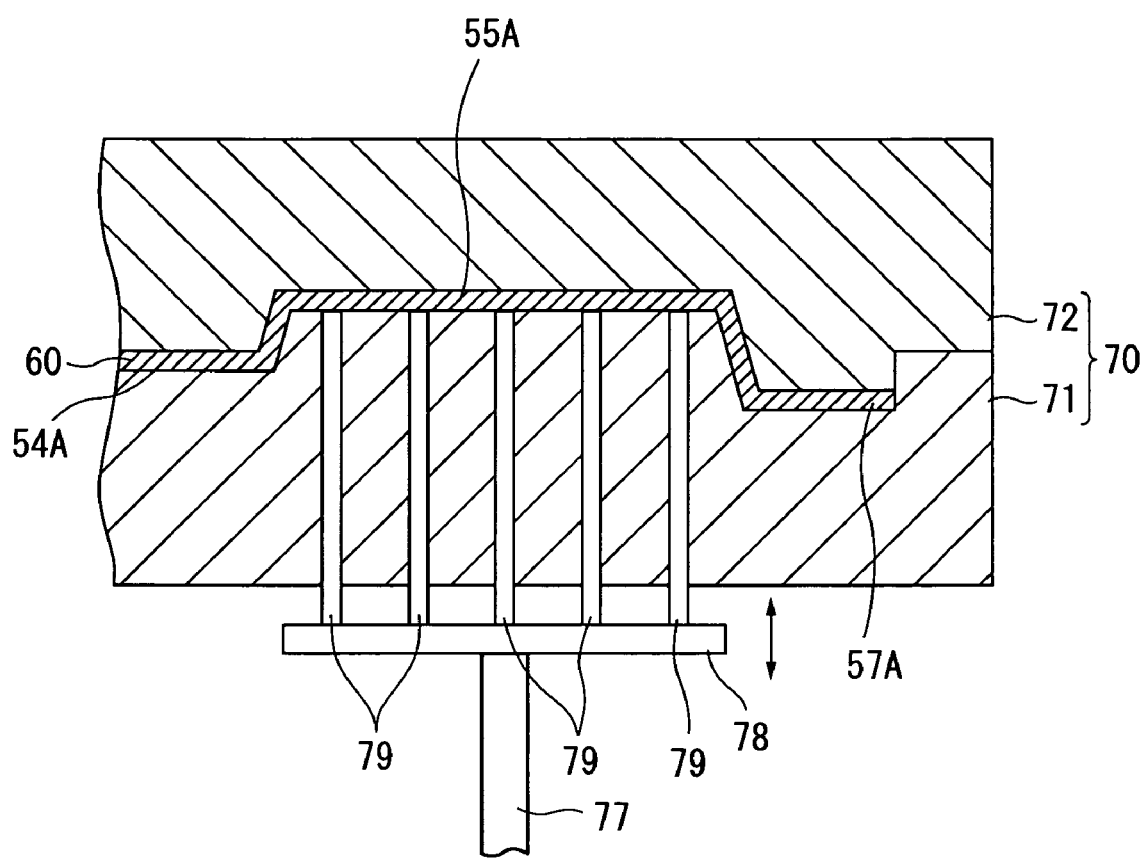
FIG. 8 is a cross-sectional view showing a modification of the situation in which a module piece is molded with a die according to the second embodiment.

When the holes 56 are formed, as shown in FIG. 8, the machining tool 77 is positioned at a position corresponding to the hole 56 on the upper resonating section 55B of the upper module piece 61 in the die frame 72 or on the lower resonating section 55A of the lower module piece 60 so that a tip of the pin 79 can move into and move back from the molding space 75. Then, the machining tool 77 may be heated so that the pin 79 is protruded into the molding space 75 to form the hole 56 according to the necessity.

With the embodiment described above, further advantages as described below can be obtained in addition to those in the first embodiment described above.

(3) The holes are formed inside the inlet system 2 having a cylindrical shape, it is possible to easily manufacture the inlet system 2 required to absorb sounds therein.

(4) The holes 56 are formed before divided bodies (lower module piece 60 and upper module piece 61) are jointed to each other, so that the holes 56 can be easily formed.

(5) As the divided bodies (lower module piece 60 and upper module piece 61) are jointed to each other by means of the vibration welding method, jointing can be performed without causing displacement of the jointed surfaces or the like. Therefore, the sound absorbing capability can be realized without fail.

Third Embodiment

Figure 9:
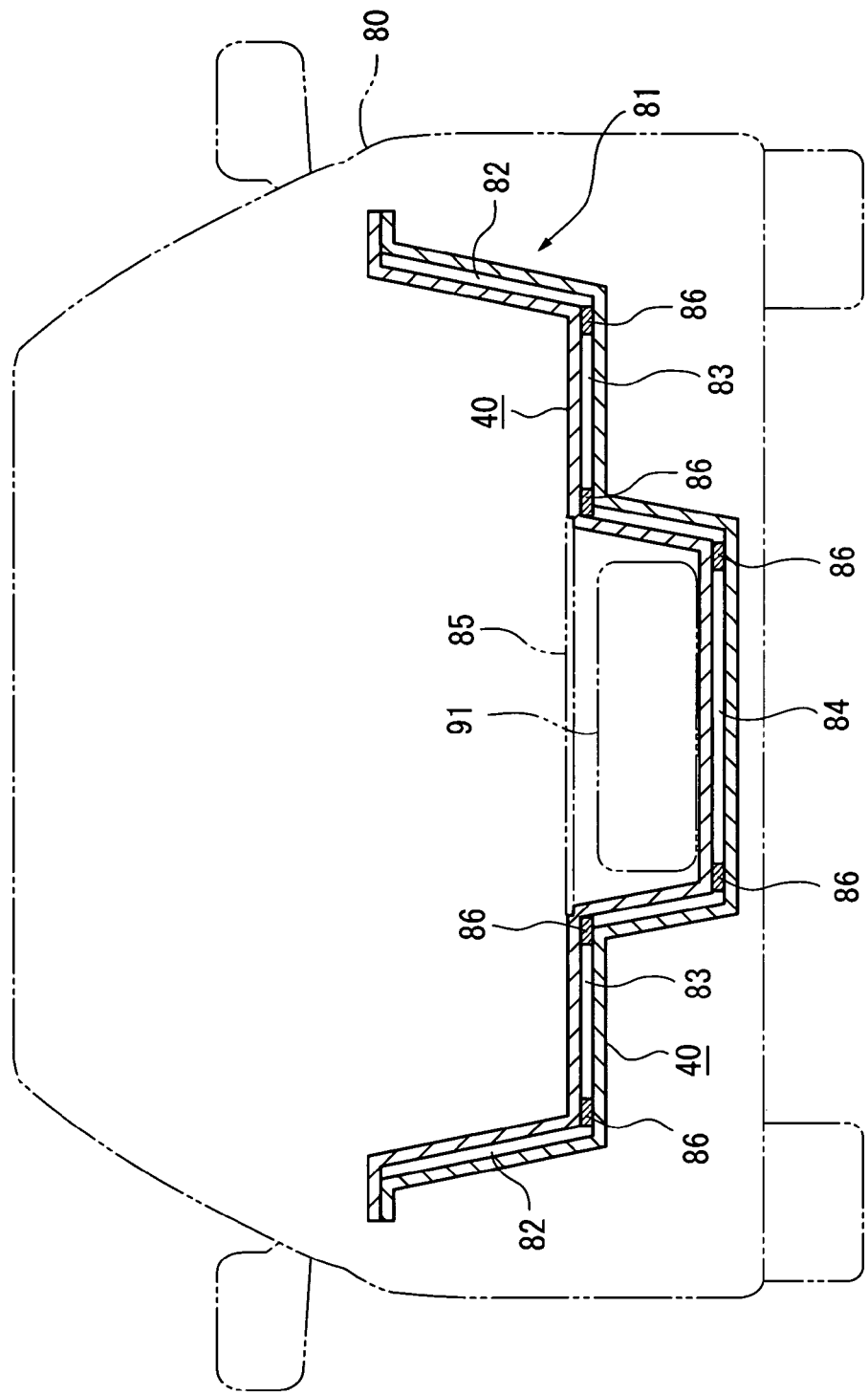
FIG. 9 is an illustration showing a trunk room of an automobile according to a third embodiment of the present invention.

A trunk room 81 according to this embodiment uses the sound absorbing body 40 as a plate-shaped member as shown in FIG. 9.

The trunk room 81 is provided in a rear section of an automobile 80. The trunk room 81 includes a side surface section 82, a bottom surface section 83, and an accommodating section 84, and is formed with two sheets of sound absorbing bodies 40 laminated in the vertical direction.

The side surface section 82 is provided with inclination against the bottom surface section 83. The bottom surface section 83 is substantially horizontal. The accommodating section 84 is provided at a substantially central portion (not shown) of the trunk room 81 and has a shape like a watershoot. An accommodation cover 85 is located at the upper side of the accommodating section 84 and is connected to the bottom surface section 83. Spare tires or the like are accommodated in the accommodating section 84.

Figure 10:
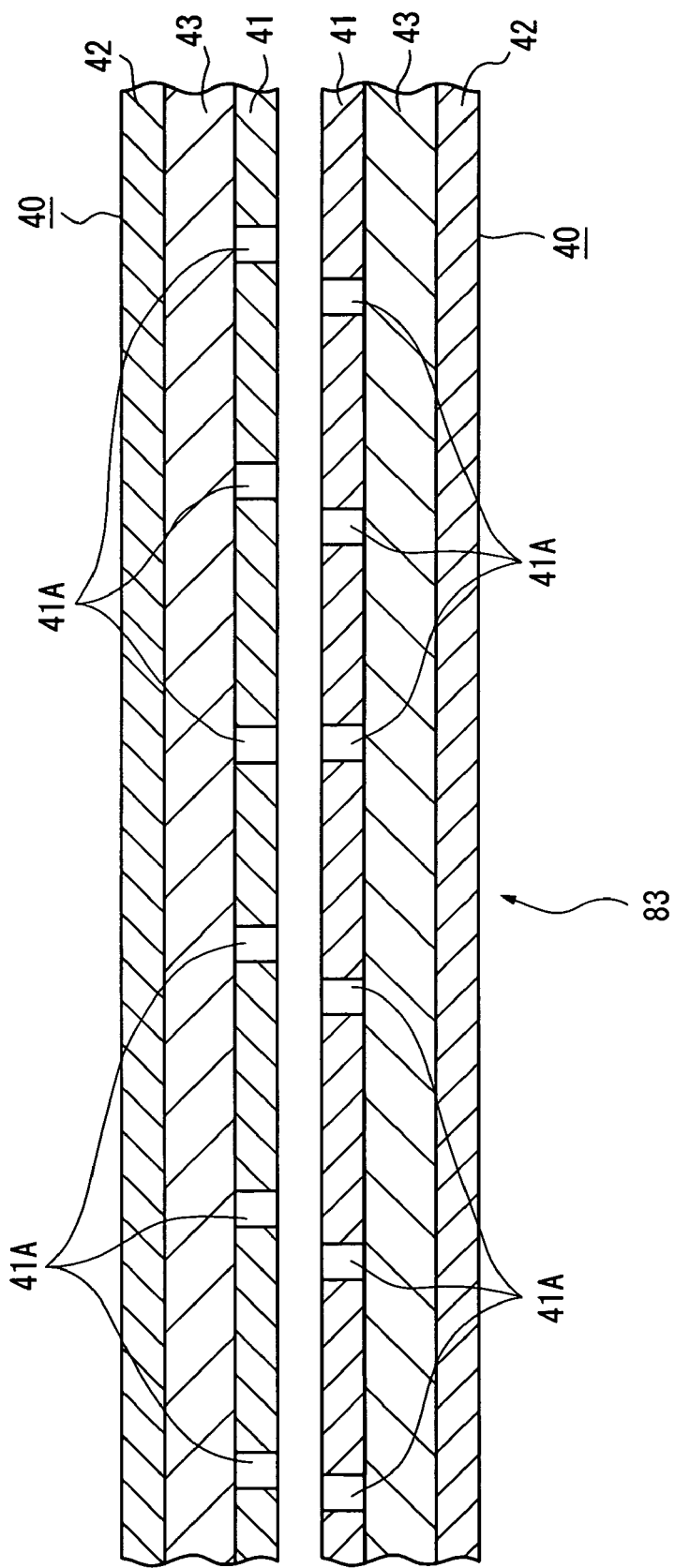
FIG. 10 is an enlarged cross-sectional view showing a bottom section of the trunk room according to the third embodiment.

A plurality of spacers 86 are provided between the upper and lower sound absorbing bodies 40 each constituting the trunk room 81, and a clearance is generated by the spacers 86. To describe more specifically, as shown in FIG. 10, the upper and lower sound absorbing bodies 40 are placed so that the unexpanded layers 41 face to each other. A plurality of holes 41A are formed on the unexpanded layer 41. The hole 41A has a depth that passes through the unexpanded layer 41 but does not reach the unexpanded layer 42 as in the first embodiment. A cross-sectional area of the hole 41A is in the range from 0.785 to 314 mm$^2$, and the pitch is 1 mm or larger, and more preferably in the range from 10 to 200 mm. An inner diameter of the hole 41A is in the range from 1 to 20 mm. When a cross-sectional area of the hole 41A is less than 0.785 mm$^2$, sometimes sounds with a selected high frequency may not be absorbed. When a cross-sectional area of this hole 41A is less than 314 mm$^2$ (Translator's comment: over 314 mm$^2$), sometimes sounds with a selected low frequency may not be absorbed.

In this embodiment, the holes 41A of the upper and lower sound absorbing bodies 40 have the same inner diameter, but the pitch between the holes 41A on the upper sound absorbing body 40 has a different value from that on the lower sound absorbing body 40 within the range described above.

As for the procedure for manufacturing the trunk room 81, for instance, there can be enlisted a procedure in which a molded body is manufactured according to the procedure as described in the first embodiment; then the molded body is formed into a desired form; and then the holes 41A are formed thereon, or a procedure in which a molded body including unexpanded layers and an expanded layer is molded with a die frame having a specified shape as described in the second embodiment; and then the holes 41A are formed thereon.

The raw materials and the like are the same as those in the first embodiment.

With the embodiment described above, further advantages as described below can be obtained in addition to those in the first embodiment.

(6) A pitch between the holes 41A on the upper sound absorbing body 40 is different from that on the lower sound absorbing body 40. Namely, as there are two types of pitches, a frequency range of sounds to be absorbed selectively can be widened, and therefore unpleasant sounds can be absorbed in a wider frequency range.

Fourth Embodiment

Figure 11:
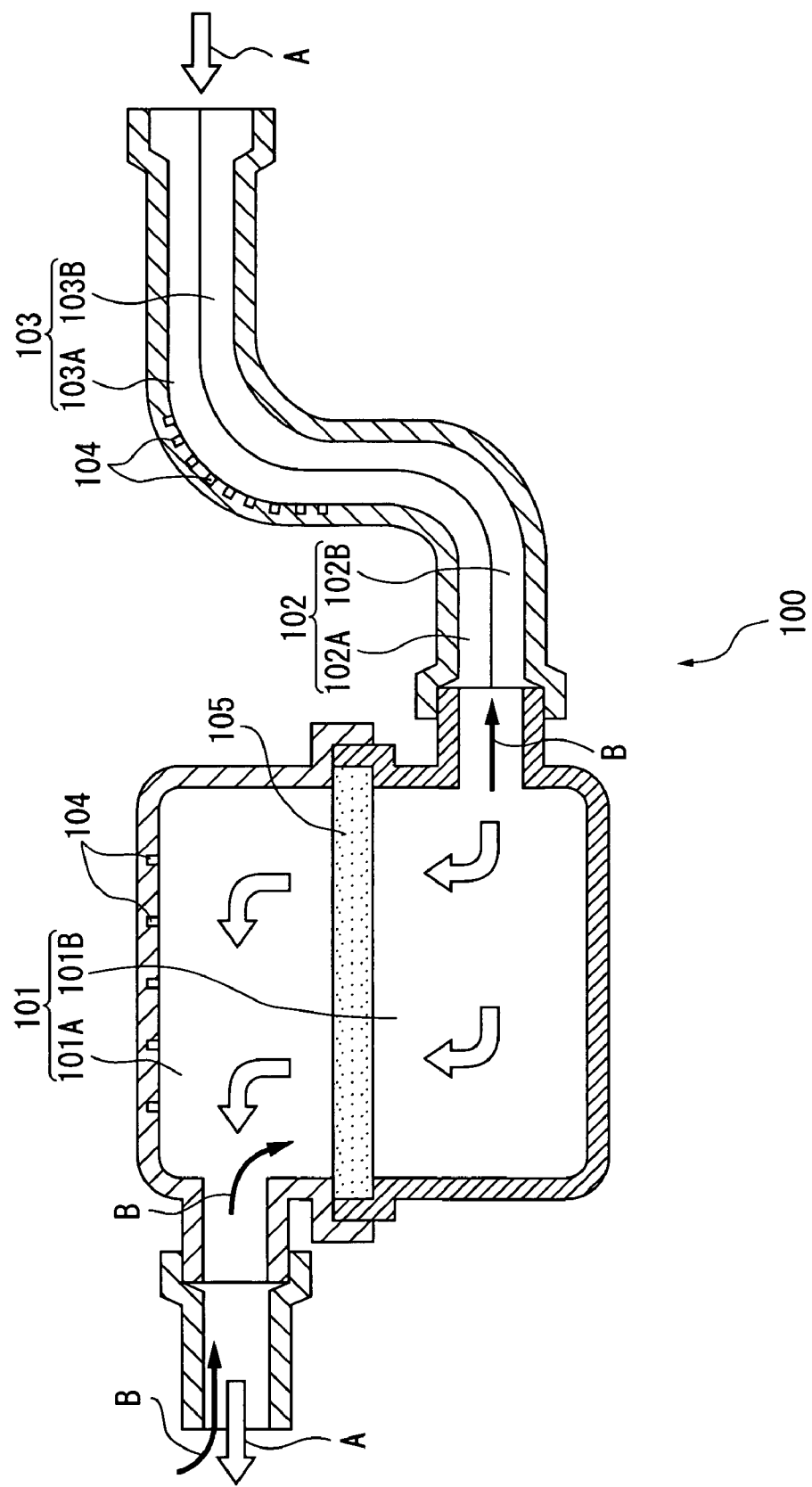
FIG. 11 is a cross-sectional view showing an inlet system according to a fourth embodiment of the present invention.

An inlet system 100 according to the present embodiment includes, as shown in FIG. 11, an air cleaner section 101, a duct section 102, and a resonator section 103.

This inlet system 100 is manufactured by molding the air cleaner section 101, duct section 102, and resonator section 103 separately by the same molding method as that employed in the second embodiment, and then connecting the sections to each other.

The air cleaner section 101 has a substantially vessel-like shape, and includes an upper air cleaner section 101A positioned in the upper side and a lower air cleaner section 101B positioned in the lower side. Provided in the upper air cleaner section 101A is a connection port through which air and sounds pass as shown in the left upper side of the figure. A plurality of holes 104 are formed on an inner wall in the upper section of the upper air cleaner section 101A.

A connection port through which air and sounds pass is also provided in the lower air cleaner section 101B as shown in the right bottom section of the figure. A filter 105 is provided with the horizontal posture between the upper air cleaner section 101A and the lower air cleaner section 101B. This filter 105 has a rectangular cross section, and functions to collect dusts or the like.

A duct section 102 is connected to the connection port of the lower air cleaner section 101B shown in the right bottom section of the figure. The duct section 102 has a linear cross section, and comprises an upper duct section 102A positioned in the upper side and lower duct section 102B positioned in the lower side.

The resonator section 103 has a cross section with a substantially L shape, and includes an upper resonator section 103A and a lower resonator section 103B. The duct section 102 and the resonator section 103 form a continuous cylindrical member.

On the inner wall surface in a bent section of the resonator section 103, a plurality of holes 104 are formed. A cross-sectional area, a pitch and other parameter of each of these holes 104 are the same as those of the hole 56 in the second embodiment. Further, the cleaner section 101, duct section 102, and resonator section 103 are molded by the same molding method as that employed in the second embodiment, so that not-illustrated unexpanded layers are formed on surfaces of these components.

This inlet system 100 is used as a component of a vehicle or the like. When this inlet system 100 is used, sounds generated by and coming from an engine enter the resonator section 103 and advance to the holes 104 in the resonator section 103 as indicated by the arrow A in the figure. In this step, as a smaller one of the angles formed by the propagating direction of the sounds and a surface of the not-illustrated unexpanded layer is in the range from 60 to 90 degrees, so that the sounds are well absorbed in the holes 104.

Then, the sounds having reached the duct section 102 pass through the air cleaner section 101 and also pass through the filter 105 as shown in the figure. Then, the sounds advance toward the plurality of holes 104 formed in the upper air cleaner section 101A.

As a smaller one of the angles formed by the propagating direction of the sounds and a surface of the not-illustrated unexpanded layer is about 90 degrees, so that the sounds are again absorbed in the holes 104.

As indicated by the arrow B in the figure, air from the outside passes through the air cleaner section 101, and the filter 105 removes dusts and the like in the air.

With the embodiment described above, further advantages can be obtained in addition to those in the first embodiment.

(7) As the holes 104 are formed in the air cleaner section 101 as well as in the resonator section, sounds can be securely absorbed.

Modification

The present invention is not limited to the embodiments described above, and modifications and improvements within a scope in which the objects of the present invention can be achieved are included in the present invention.

For instance, although a cross-sectional area of each of the holes 41A, 56, and 104 and a pitch between the holes are limited to one value respectively, but the present invention is not limited to this configuration, and the cross-sectional area and the pitch may have two or more different values.

Although a cross section of each of the holes 41A, 56, and 104 is circular in the embodiments described above, the present invention is not limited to this configuration, and any shape such as oval, polygonal, conical and the like may be employed as a shape of the cross section.

Further, although the expanded layer includes one type of region having the same expansion ratio in the embodiments described above, the present invention is not limited to the configuration, and the expanded layer may include a plurality of regions having different expansion ratios respectively.

Although the molding method employed in the first embodiment is used in other embodiments described above for manufacturing a sound absorbing body including one type of expanded layer, but the present invention is not limited to this configuration, and a sound absorbing body may be molded with a die including a movable die having a plurality of cavity forming surfaces movable forward to and backward from the internal cavity. In this case, a sound absorbing body comprising an expanded layer having a plurality of regions having different expansion ratios respectively is manufactured. The plurality of regions may include a highly expanding region with the expansion ratio in the range from 1.2 to 3.0 times.

Although the sound absorbing structural body is used as the resonator section 103, trunk room 81, air cleaner section 101, or air duct section 102 in the embodiments described above, the present invention is not limited to the embodiments, and the sound absorbing structural body may be used also as a cylinder head, a timing belt cover, an engine cover, an insulating plate between an engine room and a room, an intake manifold or the like.

In a case where a sound absorbing body may be included as a portion of the sound absorbing structural body, the insert molding may be employed, in which after a sound absorbing body is manufactured according to the procedure employed in the first embodiment, the sound absorbing body is inserted into inside of a die or the like, and then resin for remaining portions other than the sound absorbing body is injected and filled for molding.

Further, the two-color molding method may be employed, and in this case, a sound absorbing body is manufactured in the primary molding or the secondary molding, and then resin for remaining portions is injected and filled.

In the second and fourth embodiments, vibration welding is used for jointing the upper and lower module pieces 60, 61 or the like, but the present invention is not limited to the embodiments, and such methods as the die slide injection process, die rotary injection process, hot-plate welding, and laser welding may be employed.

Other structures and forms may be employed for carrying out the present invention within a scope in which the objects of the present invention can be achieved.

The present invention is described in further details with reference to examples and comparative examples. It is to be noted that the present invention is not limited to the examples described below.

EXAMPLE 1

A sound absorbing body was manufactured according to the procedure employed in the first embodiment. The raw materials, conditions for molding, hole size, and pitch employed in this example are as described below. Molding was performed at the expansion ratio of 2.5 times (wall thickness: 2 mm at initial point to 5 mm when removed from the die).

The absorbing coefficient was measured for the sound absorbing body 40 manufactured as described above in accordance with the tube method as defined in JIS A1405 for measurement of normal incidence sound absorbing coefficient.

| (Raw materials) | | |
|---|---|---|
| | Resin composition containing glass fiber by 30 weight % | |
| 1) | Glass fiber reinforced polypropylene pellets; 100 weight portion (produced by Idemitsu Petrochemical Co., Ltd., Product name: Mostron L) | |
| | Diameter of pellet: | 2 mm |
| | Length of pellet: | 12 mm |
| | Content of glass fiber in pellet: | 40 weight % |
| | Length of glass fiber: | 12 mm (which is identical to the pellet length) |
| 2) | Polypropylene: | 33 weight portion |
| (Conditions for molding) | | |
| 1) | Molding temperature: | 250° C. |
| 2) | Die temperature: | 60° C. |
| 3) | Molding machine: | Horizontal injection molding machine |
| | (produced by MITSUBISHI HEAVY INDUSTRIES LTD., 850 MGW-160, die clamping force of 850 t) | |
| 4) | Hole: Formed with the depth dimension of 2 mm, and any of the combinations A to I of inner diameter and pitch shown below. | |
| (Size and pitch for holes) | | |
| A: | Inner diameter: | 5.0 mm, pitch: 25 mm |
| B: | Inner diameter: | 5.0 mm, pitch: 20 mm |
| C: | Inner diameter: | 5.0 mm, pitch: 15 mm |
| D: | Inner diameter: | 3.2 mm, pitch: 20 mm |
| E: | Inner diameter: | 3.2 mm, pitch: 20 mm |
| F: | Inner diameter: | 3.2 mm, pitch: 15 mm |
| G: | Inner diameter: | 1.5 mm, pitch: 25 mm |

-continued

| H: | Inner diameter: | 1.5 mm, pitch: 20 mm |
| I: | Inner diameter: | 1.5 mm, pitch: 15 mm |

Figure 12:
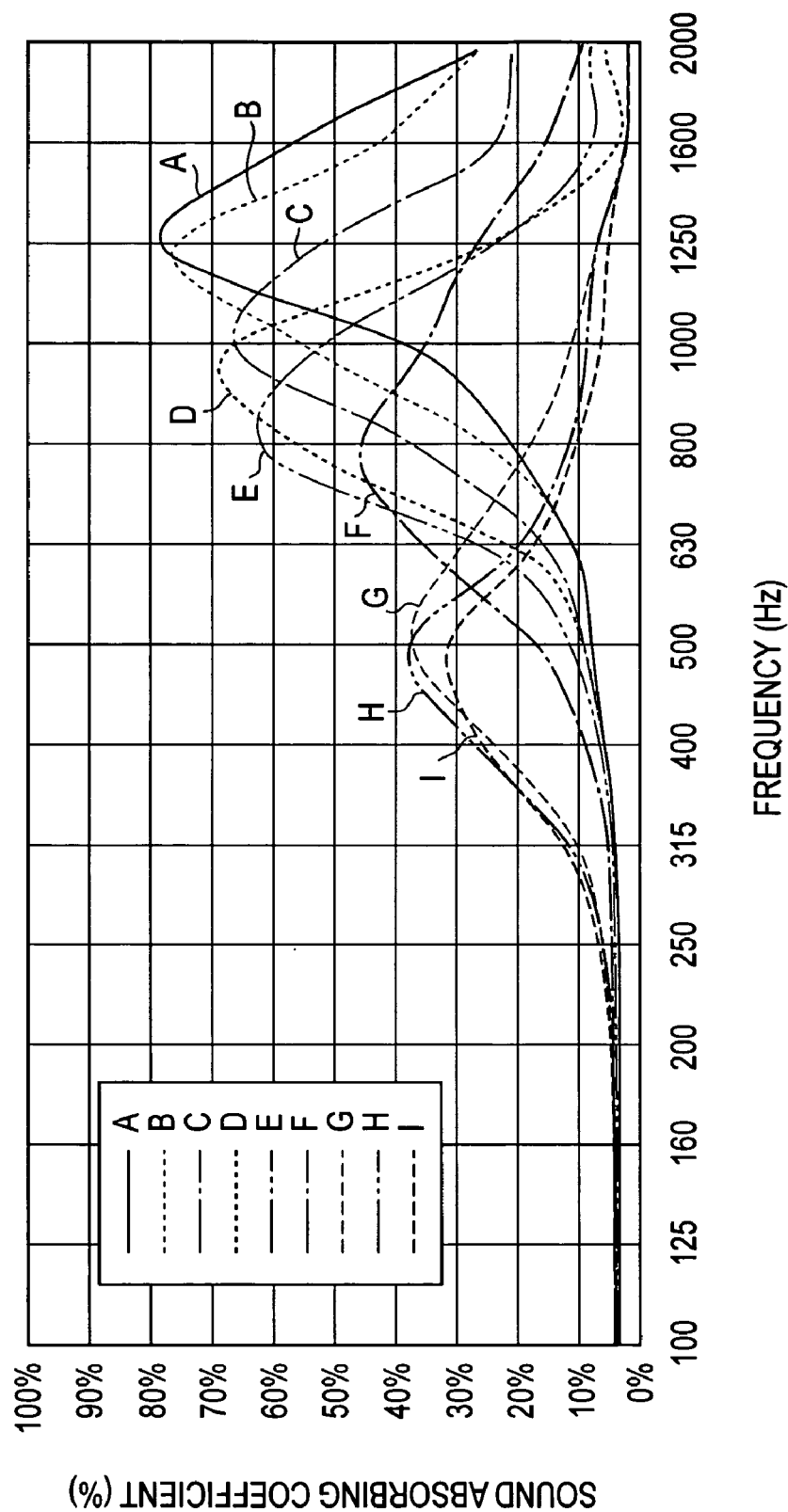
FIG. 12 is a graph showing a result of measurement in Example 1 of the present invention.

A graph for the relation between a sound absorbing coefficient and a frequency under each of the conditions A to I is shown in FIG. 12.

Comparing under the condition that the pitch between the holes 41A is identical (for instance, results for the conditions A, D, and G), it is found out that, as the inner diameter of the holes 41A is larger, the sound absorbing coefficient shows the maximum peak at a high frequency.

Comparing under the condition that the inner diameter of the holes is identical (for instance, results for the conditions A, B, and C), it is found out that, as the pitch is larger, the sound absorbing coefficient shows the maximum peak at a high frequency. Therefore, a frequency of sounds to be absorbed can be changed by changing an inner diameter (or a cross-sectional area) or a pitch of holes in a sound absorbing body.

EXAMPLE 2

The inlet system 2 was manufactured according to the second embodiment. The raw materials and conditions for molding were the same as those employed in Example 1 except the following points:
1) Temperature of a machining tool for opening holes: 160° C.
2) Vibration welding: The pressure for pressing the upper and lower module pieces was adjusted to 3 MPa and also the vibration frequency was adjusted to 100 Hz.
3) Formed body: Initial wall thickness: 2 mm
    Wall thickness when separated from the die: 4 mm (3 seconds after completion of injection)
4) Size and pitch for holes provided in the upper and lower module pieces:
    Provided at random with the inner diameter of 5 mm, depth of 2 mm, and pitch in the range from 5 to 25 mm. Total of the cross-sectional areas is 30% relative to the cross-sectional areas of the upper faces and the lower faces of the resonator 55.

In this Example 2, the inlet system 2 is manufactured by integral molding, and therefore can secure both the sound absorbing capability and sound insulating capability. As sounds with any frequency can be absorbed selectively, only unpleasant sounds can selectively be absorbed.

Although it seems in FIG. 5 that the sound absorbing body is provided in parallel to the direction in which sounds propagate (which is substantially the same as that in which air moves), but because of the characteristics as an inlet system, the sound absorbing body can not be provided at a position vertical to the upper and lower faces of the resonator 55 where the sound absorbing coefficient takes a maximum value. Nevertheless, reflection of sounds or other phenomena occurs on the internal surface of the inlet system and a portion of the sounds collide the sound absorbing body in the resonator section with an angle, so that the sound absorbing capability is realized.

EXAMPLE 3

A plate-shaped expanded molded body with the dimensions of 60 mm×60 mm was prepared at the expansion ratio of 4 times (wall thickness: 2 mm to 8 mm when separated from the die) under the same conditions employed in Example 1 described above, and a hole with the diameter of 20 mm and the depth of 4 mm was opened at the center.

Figure 13:
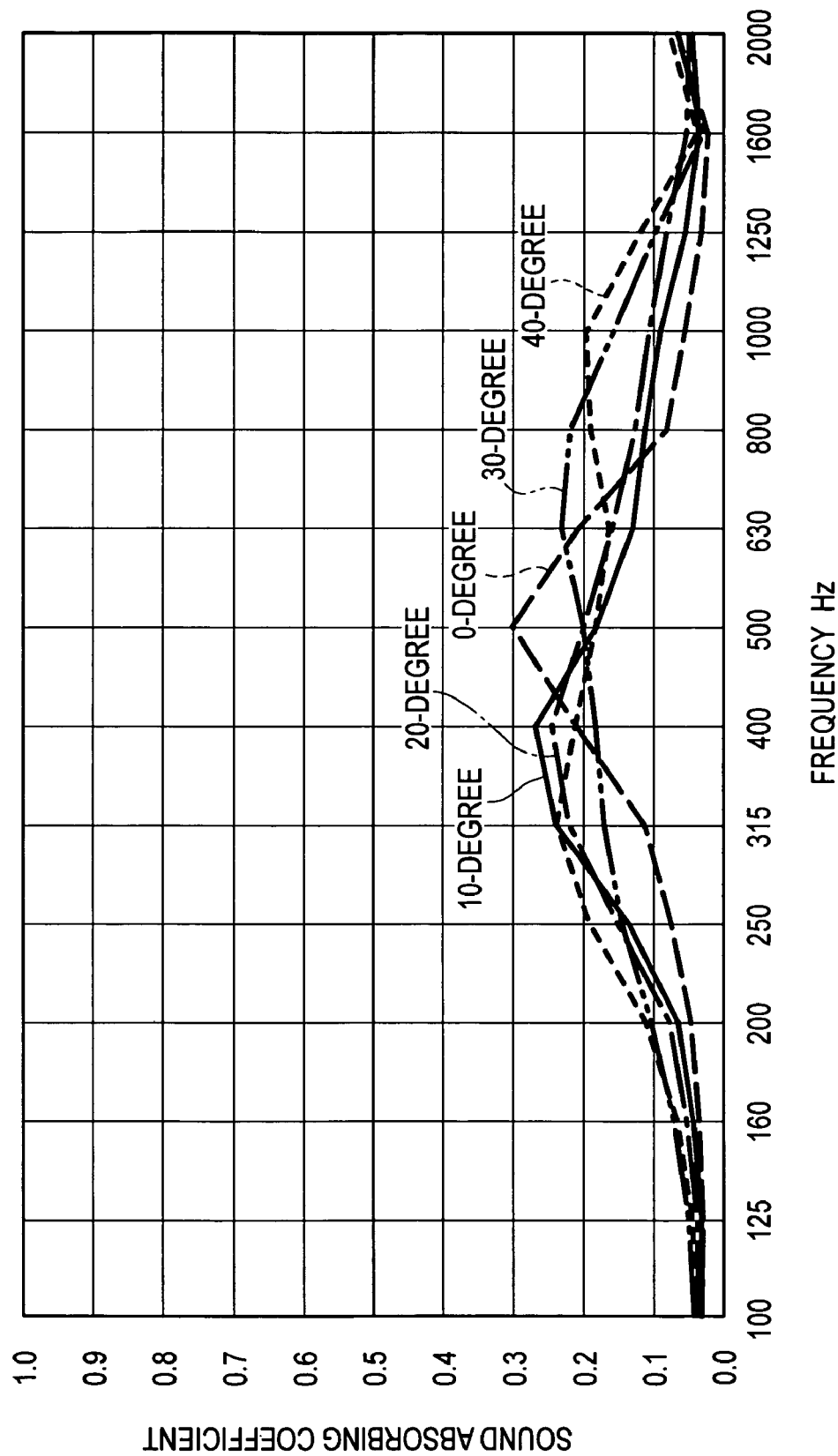
FIG. 13 is a graph showing a result of measurement in Example 3 of the present invention.

Measurement of the sound absorbing coefficient of the molded body was performed in accordance with the sound absorbing coefficient measurement by the tube method as defined in JIS A1405. The measurement was performed by changing the inclination by 10, 20, and 40 degrees relative to the direction in which the sonic waves propagate. A result of the measurement is shown in FIG. 13.

This Example 3 indicates that the sound absorbing coefficient becomes higher and also selectivity of a frequency region for sound absorption becomes higher as the angle formed by the propagating direction of sonic waves and a surface of the molded product (obtained by subtracting the inclination angle from 90 degrees) is closer to 90 degrees. When the angle is in the range from 60 degrees to 90 degrees (but less than 90 degrees), even if the maximum sound absorbing coefficient becomes a little lower, sound absorption can be performed in a wider sound absorbing range substantially keeping the sound absorbing coefficient at a constant level.

EXAMPLE 4

Figure 14:
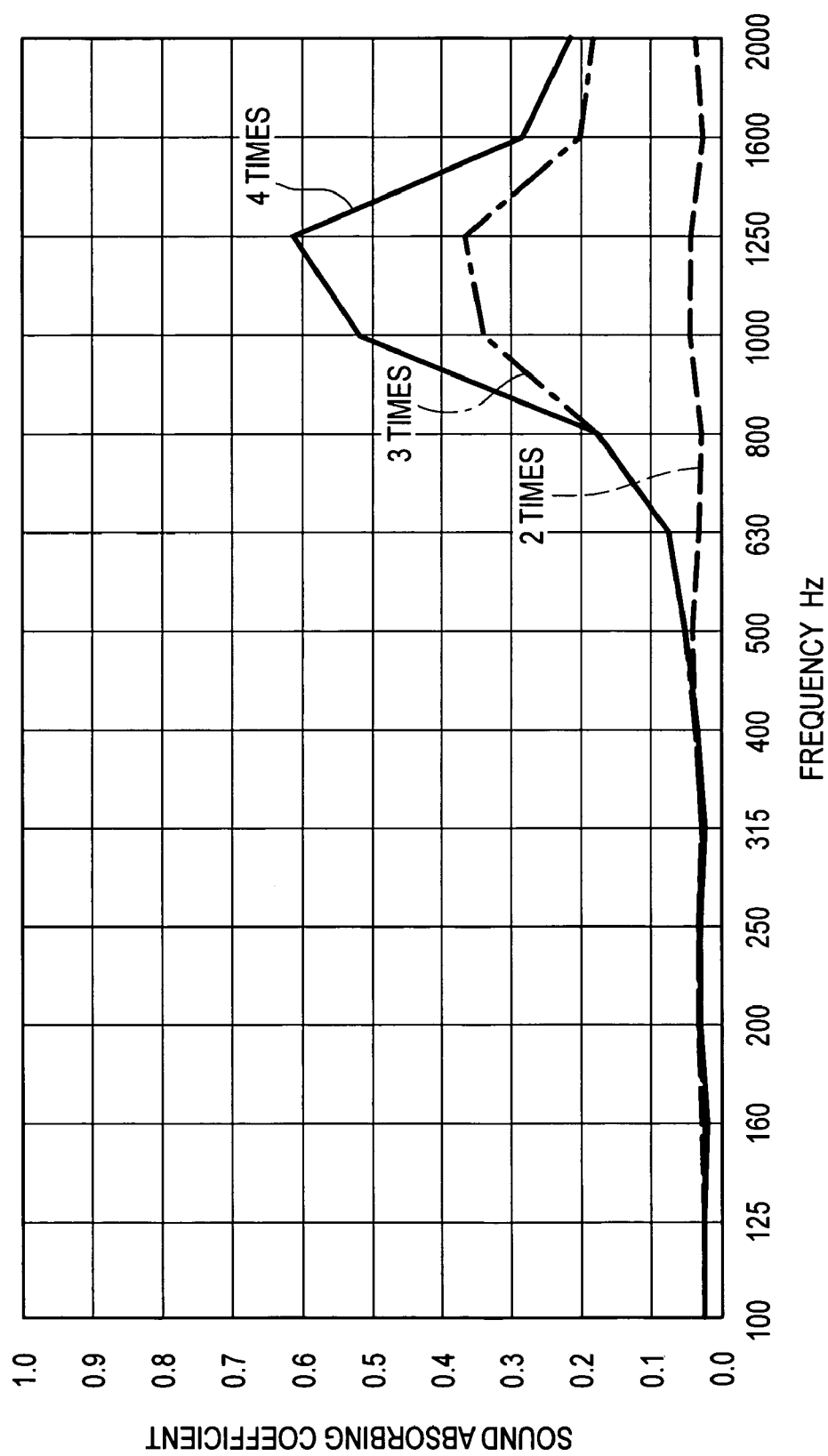
FIG. 14 is a graph showing a result of measurement in Example 4 of the present invention.

A plate-shaped expanded molded body with the dimensions of 60 mm×60 mm was prepared under the same conditions as those employed in Example 1 described above by changing the expansion ratio to 2 times, 3 times, and 4 times (wall thickness: 2 mm to 4, 6, 8 mm when separated from the die), and a hole with the diameter of 20 mm and depth of 2 mm was opened at the center. Measurement of the sound absorbing coefficient of the molded body was performed in accordance with the sound absorbing coefficient measurement by the tube method as defined in JIS A1405. A result of measurement is shown in FIG. 14.

This Example 4 indicates that the sound absorbing coefficient becomes higher as the expansion ratio becomes higher.

EXAMPLE 5

A plate-shaped expanded molded body with the size of 60 mm×60 mm was prepared under the same conditions as those employed in Example 1 and at the expansion ratio of 3 times (initial wall thickness: 2 mm to 6 mm when separated from the die). A surface of the molded body was divided to four substantially square zones, and a hole was formed at the center of each zone (with the pitch between the holes of 30 mm). Of these holes, both the two neighboring holes had the diameter of 1.5 mm and the depth of 3 mm respectively, the diameter of the remaining two holes was changed to 3.2 mm, 4 mm, and 6 mm, so that actually three types of molded body were prepared.

Figure 15:
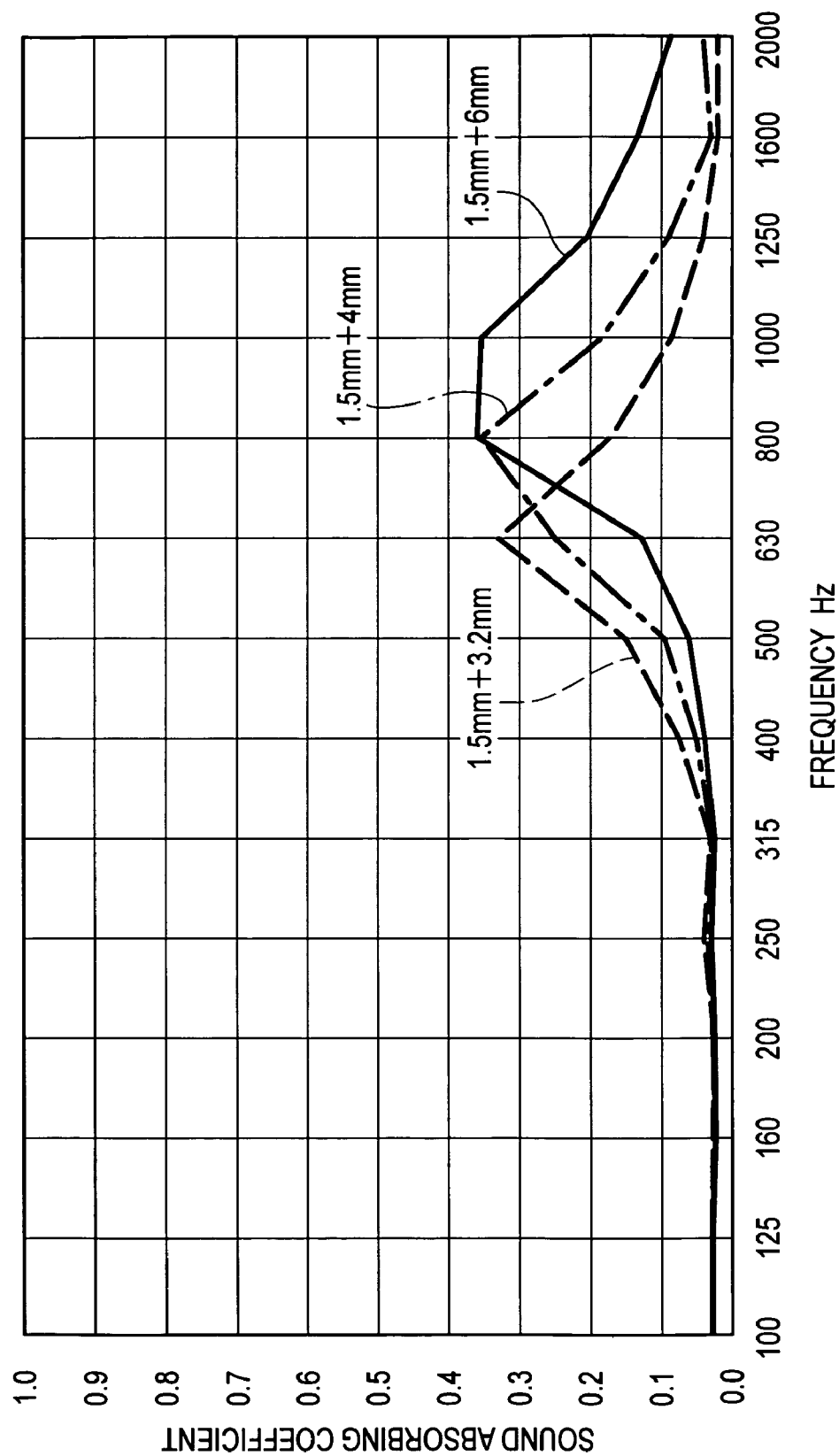
FIG. 15 is a graph showing a result of measurement in Example 5 of the present invention.

Measurement of the sound absorbing coefficient of each of the molded products was performed in accordance with the sound absorbing coefficient measurement by the tube method as defined in JIS A1405. A result of measurement is shown in FIG. 15.

This Example 5 indicates that a frequency ensuring the high sound absorbing coefficient can be adjusted in the range from 630 to 1000 Hz keeping the sound absorbing coefficient at a substantially constant level by changing a combination of the hole diameters.

INDUSTRIAL AVAILABILITY

The present invention can be applied to a sound absorbing body, a sound absorbing structural body, and a method of manufacturing the same. Especially, the sound absorbing body and sound absorbing structural body can be applied to a cylinder head for an engine of an automobile or the like, a timing belt cover, an air cleaner, an air duct, an engine cover, a resonator for absorbing or exhausting air, an intake manifold, an sound insulating plate between an engine room and a passenger chamber, and an internal decorative wall for a trunk room and the like.

The invention claimed is:

1. A sound absorbing body comprising a molded body including two unexpanded layers and an expanded layer with a number of voids and held between these unexpanded layers,
   wherein a plurality of holes each of a depth that passes through one of the unexpanded layers and do not reach the other one of the unexpanded layers are formed at any positions of the molded body, and
   a cross-sectional area of the hole is in the range from 0.785 to 314 mm$^2$ and the pitch is 1 mm or more.

2. The sound absorbing body according to claim 1, wherein at least one of the cross-sectional area and the pitch of the hole is of two types or more.

3. The sound absorbing body according to claim 1, wherein the thickness of at least one of the unexpanded layers is in the range from 0.5 to 2.0 mm.

4. The sound absorbing body according to claim 1, wherein the expanded layer has a plurality of regions having different expansion ratios.

5. The sound absorbing body according to claim 4, wherein the plurality of regions include a highly expanded region with the expansion ratio in the range from 1.2 to 3.0 times.

6. The sound absorbing body according to claim 5, wherein the holes are formed in the highly expanded region.

7. A sound absorbing structural body used in applications requiring the sound absorbing capability and containing the sound absorbing body according to claim 1, wherein the sound absorbing structural body is used as a cylinder head, a timing belt cover, an air cleaner, an air duct, an engine cover, a resonator for air absorption or air exhaustion, an intake manifold, an insulating plate between an engine room and a room, and a trunk room.

8. The sound absorbing structural body according to claim 7,
   wherein a smaller one of angles formed by the sonic wave propagating direction and a surface of the unexpanded layer is in the range from 60 to 90 degrees.

9. A method of manufacturing a sound absorbing body comprising the steps of:
   molding a formed body comprising two unexpanded layers and an expanded layer having a number of voids therein and held between these unexpanded layers with a die having a movable die capable of moving forward to and backward from an internal cavity by melting fiber-containing thermoplastic resin containing reinforcing fiber pieces each with the length adjusted within a range from 2 to 100 mm and injecting the melted resin into the cavity of the die, and then moving backward the movable die to expand the cavity for forming voids in the fiber-containing thermoplastic resin; and
   forming a plurality of holes of a depth that passes through one of the unexpanded layers and does not reach the other one of the unexpanded layers at any positions of the molded body, wherein a cross-sectional area of the hole is in the range from 0.785 to 314 mm$^2$ and the pitch is 1 mm or larger.

10. The method of manufacturing a sound absorbing body according to claim 9, wherein the movable die has a plurality of cavity forming surfaces capable of moving forward to and backward from an internal cavity, and
    wherein, when the molded body is molded, a region having a different expansion ratio from that of the peripheral area in sections is formed corresponding to the cavity forming surfaces of the expanded layers.

11. The method of manufacturing a sound absorbing body according to claim 9 further comprising the step of forming the holes after the molded body is molded.

12. A method of manufacturing a sound absorbing structural body used in applications requiring the sound absorbing capability comprising the steps of:
    dividing a cylindrical molded body into a plurality of divided bodies each having holes of a depth not passing through the molded body on an internal surface thereof manufactured by the method of manufacturing a sound absorbing body according to claim 9; and
    integrally jointing the divided bodies with the opposite surfaces of the divided bodies faced to each other.

13. The method of manufacturing a sound-absorbing body according to claim 12,
    wherein the method of jointing the divided bodies is any of the die slide injection process, die rotary injection process, vibration welding, hot-plate welding, or laser welding.

14. The sound absorbing body according to claim 1, wherein the hole is circular and has an inner diameter from 1 to 20 mm.

15. The sound absorbing body according to claim 1, wherein the hole is circular and has an inner diameter from 1.5 to 20 mm.

16. The sound absorbing body according to claim 1, wherein
    the expanded layer comprises a plurality of regions with different expansion ratios, the plurality of regions including a high expansion region having an expansion ratio of 1.2 to 3.0, and
    the hole is provided on the high expansion region.

17. The sound absorbing body according to claim 1, wherein the molded body is formed of fiber-containing thermoplastic resin containing reinforcing fiber in a thermoplastic resin.

18. The sound absorbing body according to claim 17, wherein the thermoplastic resin is a polypropylene resin containing an acid-denatured polyolefin-based resin denatured by unsaturated carboxylic acid or a derivative thereof.

19. The sound absorbing body according to claim 17, wherein the reinforcing fiber is glass fiber.

* * * * *